(12) United States Patent
Williamson et al.

(10) Patent No.: US 12,153,693 B2
(45) Date of Patent: *Nov. 26, 2024

(54) SENSITIVE DATA CLASSIFICATION

(71) Applicant: Protegrity Corporation, Grand Cayman (KY)

(72) Inventors: David Clyde Williamson, Great Missenden (GB); Vichai Levy, Norwalk, CT (US); Hans Meijer, Skelleftea (SE); Yigal Rozenberg, Wilton, CT (US); Lingling Yan, Morgan Hill, CA (US)

(73) Assignee: PROTEGRITY CORPORATION, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,998

(22) Filed: Sep. 15, 2022

(65) Prior Publication Data

US 2023/0013306 A1 Jan. 19, 2023

Related U.S. Application Data

(63) Continuation of application No. 17/019,201, filed on Sep. 12, 2020, now Pat. No. 11,475,143, which is a
(Continued)

(51) Int. Cl.
*G06F 21/60* (2013.01)
*G06F 16/28* (2019.01)
(Continued)

(52) U.S. Cl.
CPC .......... *G06F 21/604* (2013.01); *G06F 16/285* (2019.01); *G06F 21/6245* (2013.01);
(Continued)

(58) Field of Classification Search
CPC .... G06F 21/60; G06F 21/604; G06F 21/6245; G06F 21/6254; G06F 16/285; G06N 5/022; G06N 20/00; H04L 63/0428
See application file for complete search history.

(56) References Cited

U.S. PATENT DOCUMENTS 7,636,716 B1 12/2009 Cheng
8,606,746 B2 12/2013 Yeap et al.
(Continued)

OTHER PUBLICATIONS

United States Office Action, U.S. Appl. No. 15/892,802, dated Jun. 25, 2020, thirteen pages.
(Continued)

*Primary Examiner* — Linglan Edwards
(74) *Attorney, Agent, or Firm* — Fenwick & West LLP

(57) ABSTRACT

A gateway device includes a network interface connected to data sources, and computer instructions, that when executed cause a processor to access data portions from the data sources. The processor accesses classification rules, which are configured to classify a data portion of the plurality of data portions as sensitive data in response to the data portion satisfying the rule. Each rule is associated with a significance factor representative of an accuracy of the classification rule. The processor applies each of the set of classification rules to a data portion to obtain an output of whether the data is sensitive data. The output are weighed by significance factors to produce a set of weighted outputs. The processor determines if the data portion is sensitive data by aggregating the set of weighted outputs, and presents the determination in a user interface. Security operations may also be performed on the data portion.

20 Claims, 13 Drawing Sheets

Related U.S. Application Data continuation of application No. 15/892,802, filed on Feb. 9, 2018, now Pat. No. 10,810,317.

(60) Provisional application No. 62/458,143, filed on Feb. 13, 2017.

(51) Int. Cl.
*G06F 21/62* (2013.01)
*G06N 5/022* (2023.01)
*G06N 20/00* (2019.01)

(52) U.S. Cl.
CPC ......... *G06F 21/6254* (2013.01); *G06N 5/022* (2013.01); *G06N 20/00* (2019.01)

(56) References Cited

U.S. PATENT DOCUMENTS

| | | |
|---|---|---|
| 8,769,689 B2 | 7/2014 | Hoglund |
| 9,003,552 B2 | 4/2015 | Goodwin et al. |
| 9,268,947 B1 | 2/2016 | Jarlstrom et al. |
| 9,323,949 B2 | 4/2016 | Gupta et al. |
| 9,418,237 B2 * | 8/2016 | Boukobza ......... G06F 16/24534 |
| 9,659,014 B1 | 5/2017 | Walters et al. |
| 9,734,343 B2 | 8/2017 | Galil et al. |
| 9,779,254 B2 | 10/2017 | Galil et al. |
| 9,785,795 B2 | 10/2017 | Grondin et al. |
| 9,830,149 B2 * | 11/2017 | Abadi ................... G06F 21/645 |
| 10,140,343 B2 * | 11/2018 | Parikh ................... G06F 16/285 |
| 10,333,901 B1 | 6/2019 | Bauman et al. |
| 2002/0045154 A1 | 4/2002 | Wood et al. |
| 2006/0288015 A1 | 12/2006 | Schirripa et al. |
| 2012/0226677 A1 | 9/2012 | Bolton et al. |
| 2012/0272329 A1 | 10/2012 | Grammer et al. |
| 2013/0145472 A1 | 6/2013 | Ramabhatta et al. |
| 2013/0167192 A1 | 6/2013 | Hickman et al. |
| 2014/0047551 A1 * | 2/2014 | Nagasundaram ..... H04L 63/107 726/26 |
| 2015/0242639 A1 | 8/2015 | Galil et al. |
| 2015/0278526 A1 * | 10/2015 | Bhattacharya ...... G06F 11/3692 726/1 |
| 2015/0324606 A1 * | 11/2015 | Grondin ................ G06F 3/0482 726/1 |
| 2015/0326601 A1 * | 11/2015 | Grondin .............. H04L 63/1433 726/25 |
| 2017/0063893 A1 | 3/2017 | Franc et al. |

OTHER PUBLICATIONS

United States Office Action, U.S. Appl. No. 15/892,802, dated Apr. 28, 2020, eleven pages.
United States Office Action, U.S. Appl. No. 17/019,201, dated Jun. 13, 2022, 12 pages.
United States Office Action, U.S. Appl. No. 17/019,201, dated Apr. 1, 2021, 13 pages.
United States Office Action, U.S. Appl. No. 17/019,201, dated Dec. 20, 2021, 20 pages.

* cited by examiner

400

```
┌─────────────────────────────────────┐
│ Access a data source, the data source│
│ comprising a plurality of data portions│
│                 402                  │
└─────────────────────────────────────┘
                  ↓
┌─────────────────────────────────────┐
│ Access a set of classification rules, each│
│ classification rule configured to classify a data│
│ portion of the plurality of data portions as│
│ sensitive in response to the data portion│
│ satisfying the classification rule│
│                 404                  │
└─────────────────────────────────────┘
                  ↓
┌─────────────────────────────────────┐
│ For each of the set of classification rules,│
│ apply the classification rule to the data portion│
│ to obtain an output representative of whether│
│ the data portion is sensitive│
│                 406                  │
└─────────────────────────────────────┘
                  ↓
┌─────────────────────────────────────┐
│ Weigh the output from each application of a│
│ classification rule by the significance factor│
│ associated with the classification rule to│
│ produce a set of weighted outputs.│
│                 408                  │
└─────────────────────────────────────┘
                  ↓
┌─────────────────────────────────────┐
│ Determine if a data portion is sensitive by│
│ aggregating the weighted outputs│
│                 410                  │
└─────────────────────────────────────┘
                  ↓
┌─────────────────────────────────────┐
│ In response to determining that the data│
│ portion is a sensitive data portion, perform one│
│ or more security operations on the data│
│ portion│
│                 412                  │
└─────────────────────────────────────┘
```

FIG. 4

| Date | Coordinate Identifier 802 | Classification | Score | Observed | Estimated |
|---|---|---|---|---|---|
| 2017-11-09 02:53:46 | dbms:mssql://sa@sureloccsql:1433/demograph/pers_reg_org/City | ADDRESS | 100% | 1 | 8419 |
| 2017-11-09 02:15:17 | dbms:teradata://dbc@sureloctd:1433/PROTEGRITY/Customer_details/state | ADDRESS | 100% | 1000 | 1000 |
| 2017-11-09 02:16:44 | dbms:teradata://dbc@sureloctd:1433/financial/customer_name/state_code | ADDRESS | 100% | 10 | 10 |
| 2017-11-09 02:16:45 | dbms:teradata://dbc@sureloctd:1433/financial/customer_name/postal_code | ADDRESS | 100% | 9 | 9 |
| 2017-11-14 20:33:57 | dbms:oracle://scott@surelocara:1521/SCOTT/DEPT/LOG | ADDRESS | 100% | 1 | 1 |
| 2017-11-09 02:16:45 | dbms:teradata://dbc@sureloctd:1433/financial/customer_name/city_name | ADDRESS | 100% | 0 | 0 |
| 2017-11-09 02:15:46 | dbms:teradata://dbc@sureloctd:1433/financial/credit_tran/Merchant_State | ADDRESS | 100% | 727 | 12731 |
| 2017-11-09 02:53:46 | dbms:mssql://sa@sureloccsql:1433/demograph/pers_reg_org/pcode | ADDRESS | 72% | 718 | 6044584 |
| 2017-11-09 02:53:46 | dbms:teradata://dbc@sureloctd:1433/financial/credit_tran/Merchant_Postal | ADDRESS | 69% | 505 | 8844 |
| 2017-11-09 02:52:49 | dbms:mssql://sa@sureloccsql:1433/demograph/kforg_dm_org/lan | ADDRESS | 48% | 478 | 13043 |
| 2017-11-09 02:52:49 | dbms:mssql://sa@sureloccsql:1433/demograph/lforg_dim_org/Enhei | ADDRESS | 47% | 468 | 12770 |
| 2017-11-09 02:52:41 | dbms:mssql://sa@sureloccsql:1433/demograph/fact_org/Enhei | ADDRESS | 46% | 456 | 2015746 |
| 2017-11-09 02:53:46 | dbms:mssql://sa@sureloccsql:1433/demograph/pers_reg_org/County | ADDRESS | 42% | 419 | 3527410 |
| 2017-11-09 02:14:56 | dbms:teradata://sureloctd:1433/retail/TEM/L_ORDERKEY | ADDRESS | 40% | 397 | 23869 |
| 2017-11-09 02:16:03 | dbms:teradata://dbc@sureloctd:1433/retail/TEMPPL_ORDERKEY | ADDRESS | 38% | 384 | 23107 |
| 2017-11-09 02:16:03 | dbms:teradata://dbc@sureloctd:1433/retail/CONTRACT_O_ORDERKEY | ADDRESS | 38% | 377 | 5655 |

FIG. 10 protegrity

Dashboard | Metadata | Discovery Rules | Manage Discovery | Appliance

Overview  Classifications  Data Source

Show 25 ▼ entries

Items Found

Search ...
a4270z ✕

| | Date | Coordinate | Classification | Score ▼ | Observed | Estimated |
|---|---|---|---|---|---|---|
| + | 2017-11-09 02:20:59 | dbms:teradata://dbc@sureloctd:1433/_old/a4270z/f6 | CCN | 85% | 847 | 8478 |
| + | 2017-11-09 02:20:59 | dbms:teradata://dbc@sureloctd:1433/_old/a4270z/f3 | NAME | 74% | 371 | 3711 |
| + | 2017-11-09 19:20:49 | dbms:teradata://dbc@surelocte:1433/_old/a4270z/f1 | | 0% | 0 | 0 |
| + | 2017-11-09 19:20:49 | dbms:teradata://dbc@sureloctd:1433/_old/a4270z/f7 | | 0% | 0 | 0 |

Previous [1] Next

Classification
☐ NAME (39)
☐ ADDRESS (35)
☐ DOB (19)
☐ CCN (13)
☐ SSN (13)
☐ EMAIL (2)
☐ PWD (1)

Data Store
☐ dbms:feradata://dbc
  @sureloctd.1433/
☐ dbms:oracle://scott
  @surelocora:1521/
☐ Dbms:mssql://sa
  @surelocsql:1433/

Confidence Score

Contextual Data
1202

FIG. 12

SENSITIVE DATA CLASSIFICATION

CROSS REFERENCE TO RELATED APPLICATIONS

This application is a continuation of U.S. application Ser. No. 17/019,201, filed Sep. 12, 2020, now U.S. Pat. No. 11,475,143, which application is a continuation of U.S. application Ser. No. 15/892,802, filed Feb. 9, 2018, now U.S.Pat. No. 10,810,317, which application claims the benefit of U.S. Provisional Application No. 62/458,143, filed Feb. 13, 2017, all of which are incorporated by reference in their entirety.

BACKGROUND

1. Field of Art

The disclosure generally relates to the field of data protection, and more particularly to a method of automatically classifying information into different levels of sensitive data and automatically performing actions based on the level of sensitivity and reporting actions to a user in a user interface.

2. Description of the Related Art

With the increasing reliance upon online, paperless transactions, sensitive information of users, such as social security numbers, addresses, payment information, and so on, is more and more commonly stored in online databases, and in more locations than before. This creates a wider attack surface for malicious entities to attempt to gain access to such sensitive information. Furthermore, as this sensitive information is propagated to more and more online repositories, it becomes difficult for an admin to keep track of where such data is being stored in a system. Due to human error or the complexity of a system, sensitive information may be stored in unexpected locations. For example, a user may have inadvertently kept a backup of customer data in a local storage location on a client machine. With the increased focus on data security, many new standards are being created by government and enforced against organizations. Current systems typically require a user to manually comb through the various data sources within an organization in order to determine which portions of these data sources include sensitive information. Furthermore, the user needs to manually determine how to act upon such data if it becomes necessary to modify it in order to increase the protection afforded to the data. This is a tedious procedure that can easily result in oversights and may itself create more problems as the user may have to transfer sensitive data across data sources when securing the data. Furthermore, this tedious procedure of manually discovering sensitive data in electronic systems cannot scale and compete with the pace of data growth and distribution. Thus, what is lacking is a system that can automatically parse through the data sources in an organization, intelligently determine which portions of the data sources contain sensitive data, and perform corrective action on such portions of data such that they adhere with prescribed security protocols.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates a system for automatically scanning for sensitive data from multiple data sources, according to one embodiment.

FIG. 4 is a flowchart illustrating a method of determining whether a data portion in a data source is sensitive data, according to an embodiment.

FIG. 8 illustrates an exemplary UI of a sensitive data list view, according to an embodiment.

FIG. 9 illustrates an exemplary UI of a drill down view of the sensitive data list view of FIG. 8, according to an embodiment.

FIG. 10 illustrates an exemplary UI of a different drill down view of the sensitive data list view of FIG. 8 with different classifier components, according to an embodiment.

FIG. 12 illustrates an exemplary UI of a different section of the sensitive data list view of FIG. 8 with contextual data, according to an embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary Sensitive Data Scanner System

Figure 1:
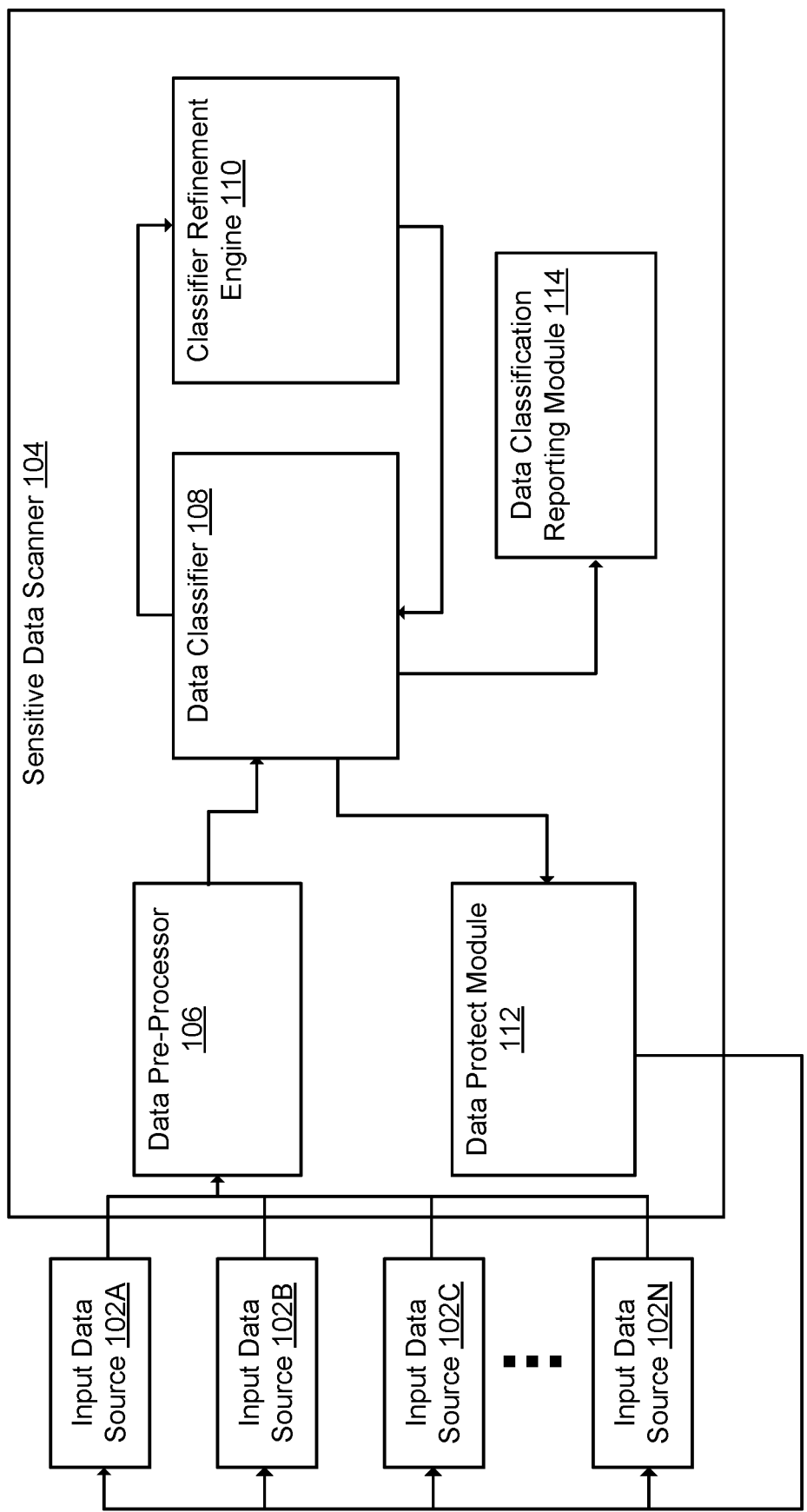

FIG. 1 illustrates a system for automatically scanning for sensitive data in multiple data sources, according to one embodiment. Although a particular arrangement of elements is shown here, in other embodiments the arrangement of elements differs from that shown while achieving the same effects. The elements shown in FIG. 1 may be implemented using a combination of hardware components, such as a processor, and software instructions, stored on computer readable storage medium and executed by the hardware components, which are described with further detail in reference to FIG. 13.

The illustrated system includes one or more input data sources 102A-N and a sensitive data scanner 104. The sensitive data scanner 104 includes a data pre-processor 106, a data protect module 112, a data classifier 108, a classifier refinement engine 110, and a data classification reporting module 114. In one embodiment, the sensitive data scanner 104 is a gateway device that is placed within the computer network of an organization and configured to, for instance, intercept data from one or more data sources, identify portions of the intercepted data as sensitive by applying classifiers to the data portions (as described below), and take one or more security options with regards to the data portions identified as sensitive.

The input data sources 102A-N include any type of data source that may include sensitive data. Sensitive data is data that may be defined as any data that is protected against unwarranted or undesired disclosure to unknown persons or the general public. This protected data may be defined by the law of a jurisdiction under which an organization operates. The protected data may also or alternatively be defined according to the desires of a set of customers, organizational policy, and so on. As another alternative, the protected data may be any type of data that may be used by a malicious actor to harm an individual, whether the harm is material or emotional, such as with identity theft or blackmail.

Examples of sensitive data that may be protected under one or more of the above definitions include financial data of an individual (e.g., a social security number, credit card information), personally identifying data (e.g., name and address), academic records, health/medical records (e.g., as protected by the Health Insurance Portability and Accountability Act of 1996), confidential information (e.g., confidential government or corporate information), passwords, private information, and so on.

The sensitive data included within the input data sources 102A-N may be of any data format. The sensitive data may be in plaintext, encrypted, audio, visual, video, binary, or any other format of data that may be read by a computer. The input data sources 102A-N may include short term storage (e.g., random access memory), or long term storage (e.g., tape drives).

Examples of input data sources 102A-N include relational databases, flat files (e.g., comma separated values files, PDF files, Excel files), structured data files (e.g., XML, JSON, AVRO), data within a customer relationship management (CRM) software, and so on.

The data pre-processor 106 receives data from the input data sources 102A-N and pre-process the data for use by the data classifier 108. The data pre-processor 106 may convert the data received from the input data sources 102A-N as well as combine the data received from the input data sources 102A-N. The data pre-processor 106 may convert the data received from the input data sources 102A-N to a usable format for the data classifier 108. In one embodiment, the data pre-processor 106 extracts features from the data received from the input data sources 102A-N. In another embodiment, the data pre-processor 106 converts the data in the input data sources 102A-N to a common data structure that may be parsed by the data classifier 108, along with metadata identifying its source in the input data sources 102A-N. This may be achieved via a variety of data conversion processes. This common data structure, may be, for example, a graph structure that indicates the relationship between various data elements from the input data (via connecting edges in the graph), and presents the input data in a single format, such as text.

The data pre-processor 106 may determine the relationship between the input data sources 102A-N using various rules. Data from the input data sources 102A-N may have a relationship as defined by the data itself. This may be in the form of related columns in a database, data from a single source, spatial or temporal proximity of data to other data, and so on. These relationships may be indicated by the data pre-processor 106 in the common structure (e.g., by connecting nodes in a graph) when the data pre-processor 106 parses the input data sources 102A-N and places the data in the common structure. For data not matching the single format in the common data structure, the data pre-processor 106 may convert this data into the single format, e.g., plain text. For example, for structured data of the input data sources 102A-N, the data pre-processor 106 may extract the data from the structured data sources into the single format, and indicate their relationship as specified in the structured data via the common data structure. As another example, for non-textual data, such as audio or visual data, the data pre-processor 106 may perform text extraction (e.g., via speech recognition, object recognition, optical character recognition) against the audio or visual data to extract text from this data to be placed in the common data structure. As another example, for binary data, the data pre-processor 106 may convert the binary data to text using various binary to text conversion protocols, such as converting binary values to ASCII. The data pre-processor 106 may place each converted data element of the input data sources 102A-N in its own unit in the common data structure. Thus, for example, the data pre-processor 106 may place each cell of a database in its own node in a graph.

The data pre-processor 106 may further combine data from different input data sources 102A-N together into the same common data structure. In one embodiment, the data pre-processor 106 combines data having the same metadata labels. This may be achieved using a matching algorithm that matches metadata labels having the exact same label or labels that are within a threshold degree of similarity (e.g., labels that match if non-alphanumeric characters are removed). The metadata label is the descriptor used in the data to describe the data, e.g., column labels, XML, tags, etc. Each metadata label may describe a portion of data that share some common characteristic. For example, a column in a database may have a metadata label indicating the data in the column are credit card numbers. The data pre-processor 106 may combine such data by indicating a relationship between them in the common data structure, or placing them in a single unit (e.g., a single node) in the common data structure. In addition to metadata labels, the data pre-processor 106 may also perform the same action, i.e., indicate a relationship or combine into a single unit, against data that have matching contents (e.g., two cells in a database with the same ID number). Furthermore, the data pre-processor 106 may combine data associated with a single metadata label into a single unit, e.g., all data under a single structure, in the common data structure.

The data pre-processor 106 may further randomly sample data from the input data sources 102A-N and place this randomly sampled data into the common data structure instead of placing the entire set of data from the input data sources 102A-N into the common data structure. For each of the subsections of the input data sources 102A-N which have separate metadata labels, the data pre-processor 106 may randomly sample data from within that subsection. Each subsection may include groups of data portions that are categorized together, such as within a single file, data instance, container, or database table. The amount of data that is sampled may be set according to a configuration parameter such that the total amount of data sampled from the input data sources 102A-N does not exceed a set value. Alternatively, the data sample size may be a percentage of each subsection of data. As the data associated with a metadata label should be categorically similar, the data classifier 108 does not need to analyze all the data associated with that metadata label as analyzing a sample of that data should provide information, i.e., an estimate, about the remainder. If the data is not associated with a metadata label, the data pre-processor 106 may randomly sample a larger portion of that data, or may include the entirety of that data within the common data structure.

Note that in various embodiments the data pre-processor 106 does not determine whether data is sensitive or not, but rather converts the data into a standardized structure and format that can be parsed by the data classifier 108. Furthermore, in other embodiments the functions performed by the data pre-processor 106 may be performed by the data classifier 108 instead, or may not be performed at all, as the data classifier 108 may directly ingest the data from the input data sources 102A-N in its original format.

The data classifier 108 determines, using computer-specific rules and algorithms, whether a data portion in the data received from the data pre-processor 106 is sensitive data, and may also determine the level of the sensitive data (i.e., how sensitive the data is). A data portion may represent a single unit of data in the common data structure generated by the data pre-processor 106, or may represent a group of data sharing similar characteristics, or may represent the smallest element of data in the data received from the data pre-processor 106 that still has semantic meaning. In other words, a data portion is a smallest unit of data that can individually convey information (or is meaningful) without relying on other data. For example, a zip code may be a data portion, as it conveys information about an address. In practice, the data classifier 108, when searching through the data from the input data sources 102A-N for data portions, may not search specifically for these smallest units of data, as this type of search may require analysis of the actual data and thus may be resource intensive. Instead, the data classifier 108 may assume that a unit of data that is separated from other data using a delimiter, such as a cell boundary in a table, a space character, an end of file marker, an audio pause, a blank video frame, and so on, is a data portion. Thus, a data portion may be a cell in a database, table, or other data structure, a table in a database, a column or row in a database, a string of characters that are not separated by a delimiter, a file, a binary blob, a segment of audio separated by a pause, multiple frames of video separated by a transition frame, an element in a data structure, and so on. In general, the data classifier 108 may determine if the data is sensitive based on pattern matching, logical rules, contextual matching, reference table matching, and machine learning.

The data classifier 108 uses pattern matching to match patterns between the data received from the data pre-processor 106 and a set of pre-defined patterns stored by the data classifier 108. If any matches are found either within the data itself or the corresponding metadata labels, then the corresponding data portions are indicated as being sensitive data. The patterns may be specified using various methods, such as regular expressions.

The data classifier 108 may also use logical rules to determine whether a data portion is sensitive data. These logical rules may indicate that a data portion is sensitive data when various conditions as specified by the logical rules are true. The logic rules may specify various characteristics of the data, such as its metadata label, size, length, contents, and so on, in order to determine whether that data is sensitive data.

The data classifier 108 may further classify data to determine whether it is sensitive using contextual matching. The data classifier 108 determines the context in which a data portion appears, and based on the surrounding context, the data classifier 108 may determine that the data portion is sensitive. The context of a data portion includes other data that has a relationship to the data portion. Other data that has a relationship to the data portion includes the other data that appears in the same file or table as the data portion, other data that references the data portion, and so on. If the other data for which the data portion has a relationship to matches certain patterns or rules, the data classifier 108 may determine that the data portion is sensitive.

The data classifier 108 may further determine that data is sensitive using reference table matching. The data classifier 108 may store various reference tables that include lists of potentially sensitive data, such as common names of persons, common terms in addresses (e.g., country codes, common street names), product names, medical conditions, and so on. The data classifier 108 may match data portions in the data received from the data pre-processor 106 with the elements in the reference tables to see if it can find a match. If a match is found, the data classifier 108 may determine that the data portion is sensitive.

The data classifier 108 may also determine that data is sensitive using machine learning algorithms. The data classifier 108 trains a machine learning model, such as a multilayer perceptron or convolutional neural network, on data known to be sensitive data. Features may first be extracted from the data using an N-gram (e.g., a bigram) model and these features input into the machine learning model for training. After training, the machine learning model will be able to determine (with a confidence level) whether data is sensitive or not. The trained machine learning model may be verified using a verification dataset composed of real world customer data, and the error rate analyzed. The machine learning model may be further improved during live operation by user feedback.

In one embodiment, the data classifier 108 uses a combination of the above methods to analyze each data portion of the data received from the data pre-processor 106. Each of the methods described above may also be associated with a significance factor indicating a confidence level in the determination made by that method. These may be weighted in a combined confidence value for that data portion indicating how likely the data portion is sensitive (i.e., the confidence of the system in making the determination). A high confidence value indicates a high likelihood that the data is sensitive data, while a low confidence value indicates the opposite.

In one embodiment, the data classifier 108 further determines the security level of data portions determined to be sensitive (or likely to be sensitive and having a confidence value beyond a certain threshold). The security level indicates how well the sensitive data portion is currently protected by various security features. The data classifier 108 may be able to detect the number and type of security feature(s) applied to the data portion. The security level may be determined to be higher based on the number of security features applied to the data portion, as well as the strength of the security feature applied to the data portion. In one embodiment, the data classifier 108 has received the various encryption keys, tokenization mapping, de-obfuscation protocol, and other information needed to read data for which one or more security features have been applied.

Although certain methods of determining whether a data portion is sensitive are described here, other methods may also be used by the data classifier 108. Additional details regarding the data classifier 108 and the methods of determining whether data is sensitive are described in further detail below with reference to FIG. 2.

The classifier refinement engine 110 tunes the data classifier 108 to improve the accuracy of the data classifier 108 (i.e., to reduce false positive and false negative classifications), using live data and additional configuration inputs.

The classifier refinement engine 110 may continue to train the machine learning module of the data classifier 108 using live data. This may be achieved by utilizing user feedback to determine whether some data portions classified as sensitive are in fact not sensitive and are false positives. The classifier refinement engine 110 may improve the accuracy of the various other methods in the data classifier 108 of determining whether a data portion is sensitive using other forms of user feedback. New patterns may be added to the pattern matching method based on user feedback indicating certain data patterns are sensitive. Logical rules may be modified by the classifier refinement engine 110 based on configuration information provided by a user or by an indication from a user that data portions in certain scenarios are sensitive. Reference tables may be updated using newly received reference data. Contextual matching may also be updated based on new indications of contextual data.

This allows the classifier refinement engine 110 to continuously refine the performance of the data classifier 108 to improve its accuracy. Furthermore, certain organizations may have data that has a format that is unique to the organization but which still include sensitive data. This data may not be normally detected using the other methods described for the data classifier 108. Instead, the classifier refinement engine 110 allows the data classifier 108 to learn that this data is also sensitive, and so the classifier refinement engine 110 allows the data classifier 108 to be customized for the specific types of data of each organization. Furthermore, the improvements made to the accuracy of the data classifier 108 may be shared to other organizations that use the sensitive data scanner 104, thereby improving the detection accuracy of the sensitive data scanner 104 in these other organizations. For example, new logical rules may be shared among different organizations. While these improvements are shared, the actual sensitive data may remain locally with the organization to avoid any transmission of any sensitive data outside the organization.

Additional details regarding the classifier refinement engine 110 are described below with reference to FIG. 3.

The data classification reporting module 114 reports the results produced by the data classifier 108 indicating whether data portions in the input data sources 102A-N are sensitive or not. The data classification reporting module 114 may present the results in a user interface to the user. The user interface may present to the user the types of sensitive data that have been detected (e.g., names, social security numbers, etc.), the number of data portions with sensitive data that have been detected, the source of these sensitive data portions, the historical trends regarding the number of sensitive data portions that have been detected, and so on. The user interface of the data classification reporting module 114 may further allow the user to drill down into any of the above presented data to see additional details, such as the exact tables where the sensitive data portions were detected, confidence scores of each detection, which methods were used in determining whether the data portion is sensitive data, and so on. The data classification reporting module 114 may also present an overall security posture of the organization based on the collected information. The data classification reporting module 114 may determine this overall security posture according to the number of data portions collected that are determined to be sensitive data and which fall below a particular security level, compared to those data portions that exceed an indicated security level. The data classification reporting module 114 may also present information, e.g., via a timeline or other UI element, regarding the progress the organization has made towards securing sensitive data that was previously unsecured or below a desired security level. Additional details and examples of the user interface generated by the data classification reporting module 114 are described below with reference to FIGS. 5-12.

The data protect module 112 may be used to apply additional security features to data portions of the input data sources 102A-N that are determined to be sensitive based on the detected security level of the data portions.

The data protect module 112 may apply a number or type of security features to the data portion so that the security level of that data portion reaches a desired level (e.g., a minimum threshold required by law or some other standard). Examples of security features that may be applied are encryption (e.g., via SHA, RSA, etc.), tokenization, obfuscation, protection via different formats, access control restrictions, encryption of connections to access the data, modification of network security policies, and so on. As applying security features to the data portion may likely cause an error in the other systems that access that data portion, the data protect module 112 may first present a report to a user in a user interface indicating the suggested changes and also link to application programming interface (API) libraries or indicate additional executable code (in various supported programming languages) to include in the other systems so that they can continue to access the data with the applied security features without error.

The above components may each execute on a single computing device or be distributed among multiple computing devices. Each computing device may include the components and function similarly to the exemplary computing device described below with reference to FIG. 13. The computing devices may be connectively coupled via a network. In one embodiment, the network may also be any type of network, including but not limited to a local area network (LAN), a metro area network (MAN), a wide area network (WAN), the Internet, a mobile, wired or wireless network, a cloud computing network, a private network, or a virtual private network, and any combination thereof. The network may also be an internal network within a device, such as a local message bus or serial communications network. In addition, all or some of links of the network can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Example Data Classifier

Figure 2:
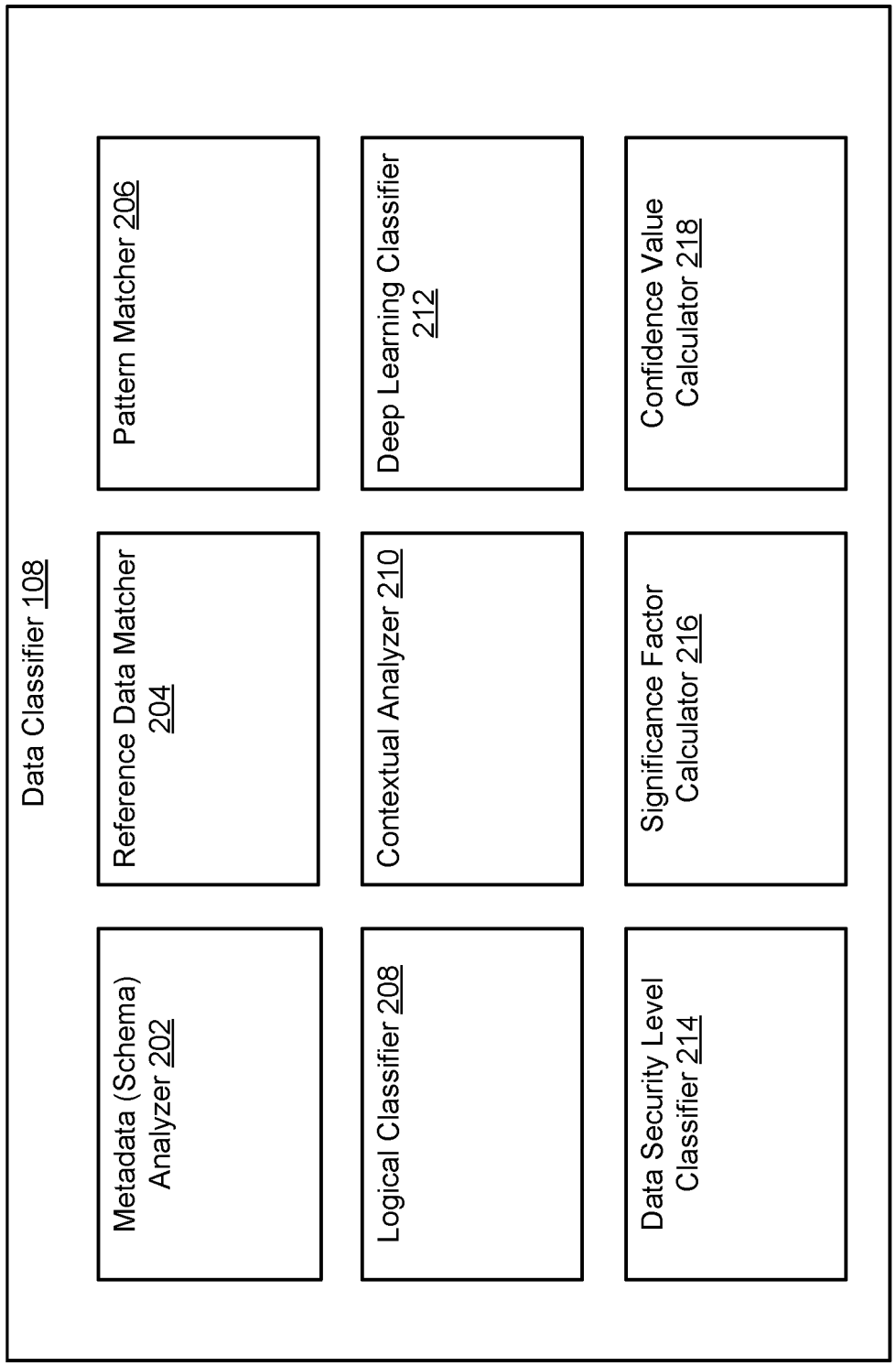
FIG. 2 is a diagram illustrating exemplary components of the data classifier 108 of FIG. 1, according to one embodiment.

FIG. 2 is a diagram illustrating exemplary components of the data classifier 108 of FIG. 1, according to one embodiment. Although a particular arrangement of elements is shown here, in other embodiments the arrangement of elements differs from that shown while achieving the same effects. The elements shown in FIG. 2 may be implemented using a combination of hardware components, such as a processor, and software instructions, stored on computer readable storage medium and executed by the hardware components, which are described with further detail in reference to FIG. 13.

As noted above, the data classifier 108 may utilize various methods to determine whether data is sensitive along with a confidence value of that determination. An exemplary set of methods are described here, although other methods may also be used in other embodiments. The illustrated data classifier 108 includes a metadata analyzer 202, a reference data matcher 204, a pattern matcher 206, a logical classifier 208, a contextual analyzer 210, a deep learning classifier 212, a data security level classifier 214, a significance factor calculator 216, and a confidence value calculator 218. Although the data portions that are analyzed by the components described herein are primarily with reference to data portions in data received from the data pre-processor 106, in other embodiments the data portions that are analyzed include data that is received directly from the input data sources 104. Each of the components described below each use various pattern match, reference match, rules, algorithms, and other methods to make determinations of whether a data portion is sensitive data. Each of these methods may be known as a classification rule, and multiple classification rules may applied to each data portion to determine whether that data portion is sensitive data.

The metadata analyzer 202 analyzes the metadata of a data portion in the data received from the data of the input data sources 102A-N to determine whether the data portion is sensitive data. The metadata may include, in the case of data pre-processed by the data pre-processor 106, the metadata labels in the common data structure. In the case where a data pre-processor 106 is not used, the metadata includes the metadata labels directly extracted from the input data sources 102A-N. This includes column labels, schema names, database names, tables names, XML, tags, filenames, file headers, other tags, file metadata, and so on. The metadata analyzer 202 may determine that a data portion is sensitive data if it indicates one or more sensitive data types, including but not limited to 1) names, 2) addresses (including subdivisions such as states, cities, counties, provinces, postal codes, and so on), 3) dates of birth, 4) telephone numbers, 5) email addresses, 6) social security numbers, 7) TextID, Codice Fiscale, or other government identification numbers, 8) medical record numbers, 9) health plan beneficiary numbers, 10) financial account numbers, such as an International Bank Account Number, 11) credit card numbers, 12) driver's license numbers, 13) IP or other network addresses, 14) biometric data, and 15) passwords and usernames.

The metadata analyzer 202 may look for any metadata that indicates one of the above sensitive data types. The metadata may have a label that directly infers the sensitive data type, or may include abbreviations or acronyms that indicate the sensitive data type. For example, a social security number sensitive data type may have a metadata of "ssn" or "soc_sec_num," and a credit card number sensitive data type may be indicated with the metadata of "ccn" or "credit_card_num," etc. Additional formulations of metadata labels may be used as well. After determining that a data portion is associated with metadata that indicates a sensitive data type, the metadata analyzer 202 may indicate that the data portion is sensitive data.

Note that the significance factor assigned to a determination that a data portion is sensitive data based on matching metadata may vary depending upon the metadata that is matched. For example, a metadata label of "social" may be assigned a lower significance factor than that of "ssn."

The reference data matcher 204 analyzes the data portions of the data received from the data pre-processor 106 with data within a reference data source to determine whether the data is sensitive data. If the reference data matcher 204 finds a match between a data portion and data in the reference data source, then the reference data matcher 204 may indicate that the data portion is sensitive data. The reference data source may include a list, database, table, or other data structure stored by the reference data matcher 204 that include lists of data that are likely to be sensitive data. The data in the reference data is data that is of a sensitive data type that does not necessarily have any shared patterns, but if matched, is highly likely to be sensitive data. For example, while social security numbers follow a distinct pattern (e.g., 3 digits, dash, 2 digits, dash, 4 digits), some sensitive data types, such as names of persons, do not follow any specific pattern or rule, and can be uniquely identified and are likely to be sensitive. Other examples of sensitive data types that may be stored in the reference data sources include usernames, email address domains, postal codes, other address components (e.g., country codes, common street names), product names, medical conditions or terms, and so on. The reference data matcher 204 may require an exact match between the data portion and the data indicated in the reference data source, or only a percentage match beyond a threshold degree (e.g., matching a percentage number of the data in the data portion to the data in the reference data source).

The pattern matcher 206 matches data portions received in the data from the data pre-processor 106 with various patterns to determine whether the data portions are sensitive data. Data portions that generate a positive match with a pattern may be determined by the pattern matcher 206 to be sensitive data. The patterns may be in any type of format that can store patterns, such as regular expressions, formal grammars, rules, wildcards, image and video pattern recognition methods (in the case of non-text data portions), and so on. For example, a sensitive data type for a social security number may be matched by the regular expression "[0-9]{3}-[0-9]{2}-[0-9]{4}" indicating a pattern of three numbers, followed by a dash, followed by two numbers, followed by another dash, and followed by 4 numbers. Other sensitive data types may be matched similarly. For example, zip codes may be matched as sequences of 5 numbers. Emails may be matched by a string of characters (the local-part), followed by the "@" symbol, followed by an alphanumeric string of characters (the domain) that may include a period, and then ending with a period and sequence of characters that matches a top level domain (e.g., ".com," ".mail"). Telephone numbers for the United States may be matched according to the standard format of the three digit area code, a delimiter, a three digit central office code, the same delimiter, and a four digit line number. Bank account numbers may be matched based on a standard length for account numbers and a set pattern limiting the types of account numbers and routing numbers that are available. Credit card numbers may be matched based on length and the fact that credit card numbers follow specific patterns (e.g., the initial issuer identification number is fixed to a set number of combinations). Dates of birth, driver's license numbers, and other sensitive data types may also follow various patterns and thus be able to be pattern matched by the pattern matcher 206.

The logical classifier 208 uses a set of stored rules to determine whether a data portion from the data received from the data pre-processor 106 is sensitive data. The data of many of the sensitive data types described above adhere to various constraints. These constraints may adhere to various rules, for which the logical classifier 208 may detect. Many of the sensitive data types are data that have values within a certain range, values that are selected from a set list of options, particular organizations, and so on. These various constraints may not be easily defined via a pattern that can be detected by the pattern matcher 206. Instead, these constraints may be more easily defined using various rules for parsing data, of which the logical classifier 208 can detect. The rules may fall into various categories. One rule may indicate that sub-portions of a data portion that is sensitive data can only one of a select number of options. Another rule may indicate that the data portion must pass some sort of verification test, such as Luhn check for credit card numbers, or having an email domain be checked to see if it is a valid domain, or determining whether a financial account number is has a valid header, or determining if a phone number's area code is valid, or whether a data portion that may be a password meets minimum password security requirements, and so on. Another rule may indicate that the data portion should be within a valid range, such as a date of birth not being in the future. Other rules may be specified for different sensitive data types. These rules may also be provided by an organization for sensitive data types, including sensitive data types that may be unique to the organization. For example, an organization may consider sensitive certain trade secret data. This data may be identifiable using rules. The organization may specify a custom rule to detect such data.

The rules may be specified using a user interface. For rules which restrict the data to certain ranges or options, input fields for ranges and the number of options may be provided for a user to enter the ranges and options that are valid. For more complicated rules, options to input computer instructions (e.g., source code) representing the rule may be provided. These computer instructions may use various programming languages, such as Haskell, perl, and so on.

Once the rules are configured, the logical classifier 208 applies the rules to the received data portions, and if the rule returns true value, i.e., an indication that the rule indicates a match for the data portion, the logical classifier 208 may determine that the data portion is sensitive data.

The contextual analyzer 210 uses contextual data in order to determine if a data portion is sensitive data. As noted previously, the context of a data portion is other data that has a relationship to the data portion. This other data is received from the data pre-processor 106, and will be hereafter referred to as contextual data. This relationship between the contextual data and the data portion may be due to 1) similar logical data storage location between the contextual data and the data portion (e.g., both are within the same or similar data object, database, table, file, etc.), 2) unidirectional or bidirectional references between the contextual data and the data portion (e.g., via reference pointers), 3) the contextual data and the data portion appearing in logical data locations that are associated with each other (e.g., the data portion and the contextual data may be split into two tables which are parts of a larger table), 4) the logical data locations of the data portion and the contextual data being near in logical distance to each other, 5) a semantic relationship between the data portion and the contextual data (e.g., via synonyms, glossaries, ontologies, or classification hierarchies), 6) the contextual data and the data portion being accessed by the same application or other data reader, 7) the contextual data and the data portion being accessed by the same user or category of user, 8) same physical storage location of the contextual data and data portion, and so on.

Note that the logical storage location of a data refers to the logical location to which the data is stored in the input data sources 102A-N. This may be a file name, database name, database schema, file name, and so on. The physical storage location, on the other hand, refers to an actual physical storage, such as hard drive, tape drive, etc., on which the data is stored.

As noted above, the data received from the data pre-processor 106 may have already combined the multiple input data sources 102A-N into a single common data structure. In such a case, the data pre-processor 106 may have already indicated the relationship between the data portion and the contextual data via the common data structure, e.g., via edges connecting the data portion and the contextual data. The contextual analyzer 210 may utilize this pre-existing relationship information in order to identify the contextual data, and then use the contextual data to determine whether the data portion is sensitive data.

In other embodiments, the contextual analyzer 210 may separately determine if the data portion has any contextual data. This may be performed by searching the input data sources 102A-N for data that has a relationship to the data portion, such as one of the relationships described above. The contextual analyzer 210 may combine the data that has a relationship to the data portion, and based on the presence of this contextual data, the contextual analyzer 210 may determine that the data portion is sensitive data.

The contextual analyzer 210, similar to the logical classifier 208, may provide a graphical interface, application programming interface, or may accept computer instructions to allow a user to provide specific instructions regarding whether the contextual analyzer 210 should determine that a data portion is sensitive data based on the contents, type, relationship, metadata, and other characteristics of contextual data that has been found for the data portion. The contextual analyzer 210 subsequently applies these contextual rules to the data received from the input data sources 102A-N to determine whether a data portion is sensitive data. As an example of such contextual rules, the contextual analyzer 210 may determine that a data portion that is a number is a credit card number if it is in a table with other financial data (such as bank information, data labeled "Financial," and so on). As another example, the contextual analyzer 210 that a data portion is a social security number if the contextual data that is in the same logical storage location as the data portion includes an email address, name, or phone number. As yet another example, the contextual analyzer 210 may determine that a data portion is a credit card number when it finds contextual data, which has a relationship of being in a table that is consecutively labeled from the table with the data portion, and which indicates names of people (e.g., credit card holders). As another example, the contextual analyzer 210 may determine that a five digit number is a zip code and is sensitive data if it finds city names in contextual data for that five digit number sequence.

The deep learning classifier 212 determines whether a data portion is sensitive using a machine learning model. The deep learning classifier 212 may employ one or more machine learning models, such as a convolutional neural network, a recurrent neural network, a long term short memory model, and other deep learning models to classify data as sensitive or not sensitive. The deep learning classifier 212 may first extract features from a data portion before feeding it into the machine learning model. This may involve extracting bigram tokens from the data portion. The extracted features are fed into the machine learning model, which outputs a prediction, e.g., a percentage value, indicating whether the data portion is likely to be sensitive data or not sensitive data. In the case of a percentage value, if the percentage exceeds a threshold, the deep learning classifier 212 may indicate that the data portion is sensitive data. Otherwise, the data is not sensitive data.

In one embodiment, the deep learning classifier 212 receives as input larger sets of data, such as entire files, and determines whether such larger sets of data include sensitive information. The deep learning classifier 212 may use techniques such as word frequency analysis, object or character recognition, and other means, to determine whether these larger sets of data include sensitive data. These larger sets of data may be specific to an organization, and the deep learning classifier 212 may be trained specifically using data from the organization.

The data security level classifier 214 optionally determines the security level of data determined to be sensitive data based on a number of security features that have been applied to the data. These security features can be generally categorized into 1) format protection, 2) access controls, 3) transmission controls, and 4) network security level. Format protection refers to security protection applied directly to the data, such as encryption, tokenization, obfuscation, or other format protection, with more and stronger format protections indicating a higher level of security. Access controls refers to limitations on access to the data by users, with fewer number of users allowed to access the data indicating a higher level of security. Transmission controls refers to whether the data is access via secure (e.g., encrypted) or unsecure channels, with access restricted to secure channels indicating a higher level of security. Network security level refers to security features implemented in the network used to access the data, such as the use of virtual private networks, network security policies, and so on. A higher network security level indicates a higher security level for the data.

The data security level classifier 214 indicates for each sensitive data portion the current security level based on the number or type of security features that have been implemented. The data security level classifier 214 may also determine an expected security level based on user configuration (e.g., as required by law). The data security level classifier 214 may further indicate the delta between the current and expected security levels. This information may be transmitted to the data classification reporting module 114 for reporting to the user.

In one embodiment, the security level of a data portion may be used, for example, by the logical classifier 208, to determine whether the data portion is sensitive data, as sensitive data may have higher security levels.

The significance factor calculator 216 assigns a significance factor to the determinations made by the various components of the data classifier 108. These components include the analyzers, matchers, and classifiers described above (i.e., the metadata analyzer 202, the reference data matcher 204, the pattern matcher 206, the logical classifier 208, the contextual analyzer 210, and the deep learning classifier 212). Each determination made by one of the components of the data classifier 108 regarding whether a data portion is sensitive data is given a significance factor. The significance factor may vary depending on the sensitive data type that is detected and the component that detects the sensitive data portion, and indicates a strength, i.e., accuracy, of the determination of sensitive data made by that component. The significance factor may be proportional to the number of false positives that are expected for the combination of data classifier 108 component and sensitive data type. For example, a zip code detected using the pattern matcher 206 based on a simple pattern of a 5 digit number may have a lower significance factor than a zip code detected using the contextual analyzer 210 based on surrounding contextual data indicating other address components. The significance factor may be significantly lower if the combination of data classifier 108 component and sensitive data type yields false positives that are above a threshold, i.e., the combination is not "discriminating." These false positives may be determined experimentally using a test set of data for each combination of sensitive data type and/or data classifier 108 component, and may be updated periodically, thus updating the significance factors periodically as well. Alternatively, the significance factor for combinations of sensitive data type and/or data classifier 108 component may be assigned by a user via a user interface.

The confidence value calculator 218 determines a confidence value for each data portion that is scanned. The confidence value is determined by combining the determinations (of sensitive or not sensitive data) made by each of the data classifier 108 components (i.e., the analyzers, matchers, and classifiers) and associated significance factors to arrive at a confidence value. In one embodiment, each of the above components of the data classifier 108 determines whether a data portion is sensitive or not sensitive only after the data portion is validated. This means that the data portion is first checked to see if it is of a right type and format for the data classifier 108 component to process. In such a case, a data portion that is processed by a data classifier 108 component is given an initial confidence value that is determined by multiplying a weight value, such as the significance factor determined by the significance factor calculator 216 for that combination of detected sensitive data type and data classifier 108 component, and a value derived from the ratio of a number of data portions that have been processed by the components of the data classifier 108 to the number of data portions that have been validated. This initial confidence value may be "booted" by determinations from other data classifier 108 components indicating that the data portion is a sensitive data. The amount of boost may be related to the corresponding significance factor from the other data classifier 108 components, computed in the fashion described above for the significance factor calculator 216. The result is a final confidence score. Multiple initial confidence scores may be computed for each data classifier 108 component for the same data portion. Boost scores from other components may be added to each of these initial confidence scores, resulting in multiple final confidence scores. The highest final confidence score may then be associated with the data portion, and may also be associated with other data which are grouped together or have a relationship with the data portion (e.g., data that is in the same column).

In another embodiment, when computing the confidence value, the confidence value calculator 218 also considers the quality of the data portion for which the confidence value is to be calculated, as well as the uniqueness of that data portion. The quality of the data portion is determined by the confidence value calculator 218 according to how many data portions were determined to be sensitive data by one of the various rules of the components of the data classifier. If fewer than a threshold proportion (e.g. 5%) of data portions out of all data portions sampled were determined to be sensitive data, this may indicate a lack of substantial data to which a determination can be made with high confidence, as typically a sensitive data portion should be accompanied by other similar data portions of similar content and type. In such a case, the confidence value calculator 218 may assign a lower score proportional to the number of samples found. The confidence value calculator 218 may use a curve of an exponential growth model to adjust the score, and may use the same curve for other data in the same data portion.

In another embodiment, the confidence value is determined by adding all the determinations of sensitive data made by the components of the data classifier 108 together as weighted by the respective significance factors. The determination that data is sensitive may be a binary outcome, as may be the case when analyzing metadata, comparing to reference or patterns, using logical classifiers, and analyzing context. In these cases, a determination of no sensitive data may be given a low value (e.g., 0.1) while a determination of sensitive data may be given a high value (e.g., 0.9). Alternatively, a determination of no sensitive data is given a 0 value, with a determination of sensitive data given a 1 value. Note that the output from the deep learning classifier 212 or the data security level classifier 216 may be within a continuous range of values. These outputs may be normalized and used directly instead of being converted as above for the binary values.

The confidence value calculator 218 may, after determining the confidence value of a data portion, send this information to the data classification reporting module 114 for reporting to the user. In one embodiment, if the confidence value exceeds a certain threshold (e.g., 50%), the corresponding data portion is determined to be sensitive data. Otherwise, the corresponding data portion is determined not to be sensitive data. In another embodiment, the confidence value is only used for reference, and the determination of whether a data portion is sensitive is made individually by each of the components of the data classifier 108.

As described with further detail below with reference to FIG. 3, an important factor in the determination of whether data is sensitive data or not sensitive data involves periodically updating the determination based on user feedback and new data that is received. Furthermore, the determination may be customized for data that is unique to a particular organization. This allows the sensitive data scanner 104 to be able to reduce false positives over time and increase accuracy for each organization's input data sources 102.

Example Classifier Refinement Engine

Figure 3:
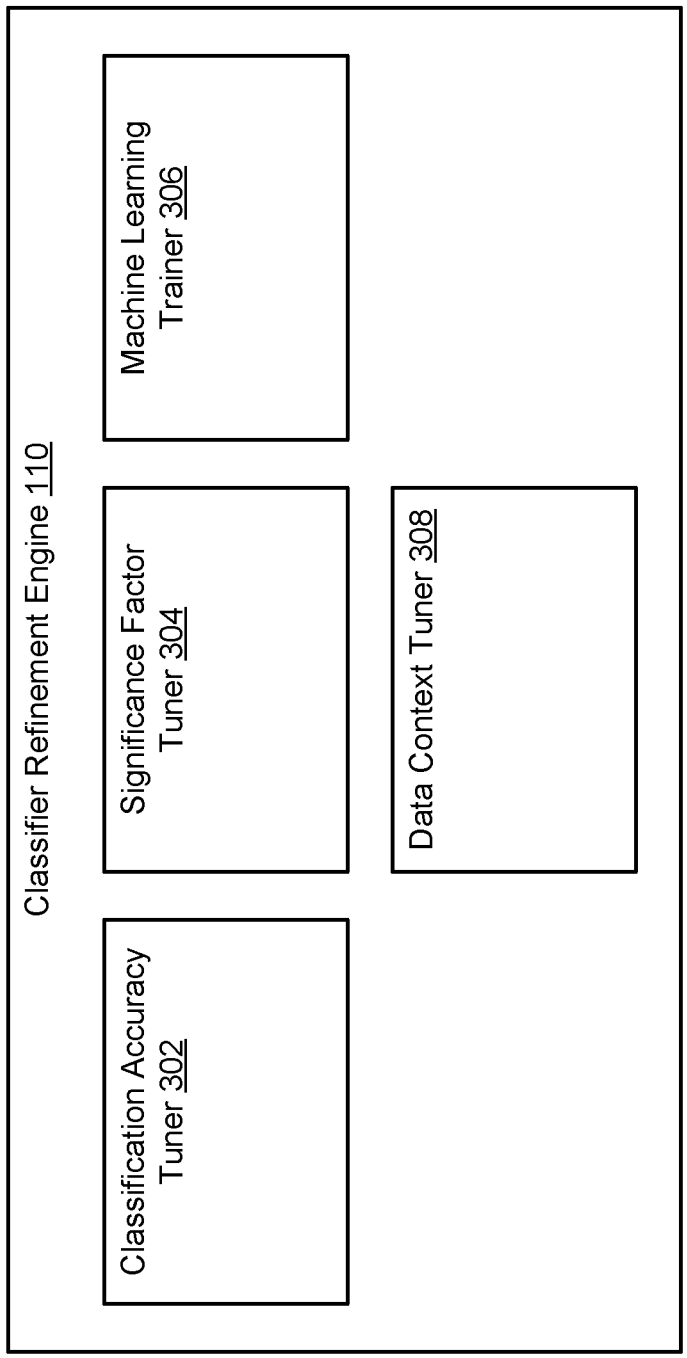
FIG. 3 is a diagram illustrating exemplary components of the classifier refinement engine 110 of FIG. 1, according to one embodiment.

FIG. 3 is a diagram illustrating exemplary components of the classifier refinement engine 110 of FIG. 1, according to one embodiment. Although a particular arrangement of elements is shown here, in other embodiments the arrangement of elements differs from that shown while achieving the same effects. The elements shown in FIG. 3 may be implemented using a combination of hardware components, such as a processor, and software instructions, stored on computer readable storage medium and executed by the hardware components, which are described with further detail in reference to FIG. 13.

As noted above, the data classifier 108 be periodically updated to provide more accurate results, including more accurate determinations of whether a data portion is sensitive or not sensitive, and improved confidence value computations. This may be achieved with the classifier refinement engine 110 described here. The illustrated classifier refinement engine 110 includes a classifier accuracy tuner 302, a significance factor tuner 304, a machine learning trainer 306, and a data context tuner 308.

The classifier accuracy tuner 302 tunes the accuracy of the base determination of whether a data portion is sensitive data for the components of the data classifier 108 that output a binary determination of whether data is sensitive data or not sensitive data. These components may be the metadata analyzer 202, the reference data matcher 204, the pattern matcher 206, the logical classifier 208, and the contextual analyzer 210.

These components of the data classifier 108 may sometimes produce false positives (i.e., data indicated to be sensitive but not actually sensitive) and false negatives (data that is actually sensitive but not indicated as such). To reduce the rates of false positives and false negatives, the classifier accuracy tuner 302 may prompt for or receive user feedback indicating whether reported sensitive data portions are actually sensitive data and whether data portions reported not to be sensitive data are actually sensitive data. For (each) feedback indicating that a determination of sensitive data was made incorrectly, the classifier accuracy tuner 302 analyzes the underlying data portion and the combination of components of the data classifier 108 that were used to make the erroneous determination. The classifier accuracy tuner 302 may determine which one of the components of the data classifier 108 contributed most to the inaccurate determination. This may be the component whose determination was weighted most heavily in the computation of the confidence value for the data portion. The classifier accuracy tuner 302 may present to the user the process used by that component to make the determination. This process may include a rule, pattern, context, metadata, or other process used by that component. The classifier accuracy tuner 302 may allow the user to modify or remove that process in order to improve the determination made by that component. For example, the user may be able to modify the pattern used to recognize sensitive data type to avoid a false positive.

The significance factor tuner 304 tunes the significance factors used to compute the confidence value to improve the accuracy of the data classifier 108. As with the classifier accuracy tuner 302, a user of the system may be periodically solicited for feedback, or the user may voluntarily provide feedback at any time, regarding the accuracy of a determination of sensitive data. This feedback may be categorized for each sensitive data type, input data source, etc. The user may indicate that the determination is accurate, or that it is inaccurate. The user may further indicate that the determination is a false positive or a false negative. After receiving a number of feedback results, the significance factor tuner 304 may adjust the significance factors used by the data classifier 108 to compute the confidence values in order to generate more accurate determinations. The significance factor tuner 304 may model the accuracy of the determinations statistically, e.g., via regression analysis, to determine the best weights for all the outputs from each data classifier 108 component which generates the most accurate confidence scores. As noted above, each component may make a determination that a data portion is sensitive data, or that it is not sensitive data. These are combined with pre-computed significance factors to generate the final confidence value for the data portion. The significance factor tuner 304 may assign a numerical representation for each determination of each component, as well as the actual correct determination as indicated by the user feedback, and perform the statistical analysis on this data to determine a best fit of the determinations made by each component and the correct determination of whether the data is sensitive. By performing this fitting, the significance factor tuner 304 may be able to determine the percentage impact that each component, for each sensitive data type (or other category), has in predicting an accurate determination of whether the data is sensitive data. The significance factor tuner 304 may then adjust the significance factors associated with component for that sensitive data type based on the determined percentage impact. In one embodiment, the significance factors may be adjusted in proportion to the percentage impact.

In another embodiment, instead of automatically adjusting the significance factors, the significance factor tuner 304 may provide an interface to the user to allow the user to adjust the significance factors manually.

The machine learning trainer 306 trains the deep learning classifier 212. The machine learning trainer 306 may receive a set of training data. The training data includes multiple data portions which are labeled as sensitive data or not sensitive data. The sensitive data type may also be labeled. This training data may be received from the user and may be custom to the user's organization or may be a generic set of training data. The benefit of using custom data is that the data is specific to the organization and the resulting trained machine learning model may generate fewer errors. A set of features may first be extracted from the training data. In cases where the training data includes text, the text may be converted into numerically meaningful data that can be used as features for the machine learning model of the deep learning classifier 212. For example, the text may be converted into a bag of word model. Various machine learning models may be used, depending on effectiveness, such as a support vector machine, a naïve Bayes classifier, or a neural network. Multiple machine learning models may be trained on the training data and the one that produces the best accuracy for the selected training data may be selected. The trained machine learning model is tested against a validation data set, and if the accuracy exceeds a certain percentage, then the machine learning model is selected by the machine learning trainer 306 for use with the deep learning classifier 212.

The data context tuner 308 automatically selects contextual data for a data portion, which may then be used by the contextual analyzer 210 to determine if that data portion is sensitive data. The data context tuner 308 may receive multiple sets of labeled training data. Each set includes data portions that are labeled as sensitive data and those that are labeled as not sensitive data. Each set of training data additionally includes different combinations of contextual data. The training data may be sourced from data within the organization. The data context tuner 308 may extract features from the training data sets, similar to the method described above for the machine learning trainer 306. The data context tuner 308 trains multiple machine learning models and/or statistical models to determine which sets of contextual data in which sets of training data best predict whether the data portion in question is sensitive data. The contextual data set of the training set that best predicts, i.e., has the highest accuracy in determining, whether a data portion is sensitive or not may then be used by the contextual analyzer 210 against unlabeled (live) data to determine if the data in the unlabeled data is sensitive or not sensitive. In another embodiment, a combination of the contextual data from the top performing models are used by the contextual analyzer 210. To use the contextual data, the contextual analyzer 210 determines if the same or similar contextual data with types matching the selected contextual data exists for the data portion that is being analyzed. If so, the contextual analyzer 210 may determine that the data portion is sensitive data.

Using the system described here, data that is potentially sensitive in an organization can be detected continuously over time, with the detection becoming more accurate over time. The sensitive data that is found is reported to the user in a user interface that indicates the sources, types, confidence value, locations, and other characteristics of the detected sensitive data. The system may also automatically apply additional security features to data that is detected to be sensitive. Such a system removes the need for significant manual intervention and analysis of significant amounts of data, and such a system evolves as the data for the organization changes. This can work to prevent security breaches of sensitive data caused by malicious hackers to the organization.

Exemplary Flow

FIG. 4 is a flowchart illustrating a method of determining whether a data portion in a data source is sensitive data, according to an embodiment. Although certain steps are shown here, in other embodiments the order and operation of each step may differ while producing a similar result. In one embodiment, the method shown here is performed by the sensitive data scanner 104.

Initially, the sensitive data scanner 104 accesses 402 a data source. The data source comprises a plurality of data portions.

The sensitive data scanner 104 also accesses 404 a set of classification rules. Each classification rule is configured to classify a data portion of the plurality of data portions as sensitive in response to the data portion satisfying the classification rule. Each classification rule is further associated with a significance factor representative of an accuracy of the classification rule in classifying data portions as sensitive. In one embodiment, the classification rules include the methods performed by the various components of the data classifier 108 as described above (i.e., the metadata analyzer 202, the reference data matcher 204, the pattern matcher 206, the logical classifier 208, the contextual analyzer 210, the deep learning classifier 212, and the data security classifier 214).

For each of the set of classification rules, the sensitive data scanner 104 applies 406 the classification rule to the data portion to obtain an output representative of whether the data portion is sensitive.

The sensitive data scanner 104 also weighs 408 the output from each application of a classification rule by the significance factor associated with the classification rule to produce a set of weighted outputs.

The sensitive data scanner 104 determines 410 if a data portion is sensitive by aggregating the weighted outputs from applying the classification rules.

In response to determining that the data portion is a sensitive data portion, the sensitive data scanner 104 performs 412 one or more security operations on the data portion to reduce a security risk of the data portion.

Exemplary UI

The following FIGS. 5-13 illustrate exemplary user interfaces (UIs) which may be presented by the data classification reporting module 114 to report the results of the determination of sensitive data that are made by the data classifier 108. These UI's may be implemented using computer executable code (e.g., HTML, CSS, JavaScript) that is transmitted by the data classification reporting module 114 to a user's client device for execution by the web browser of the user's client device.

Figure 5:
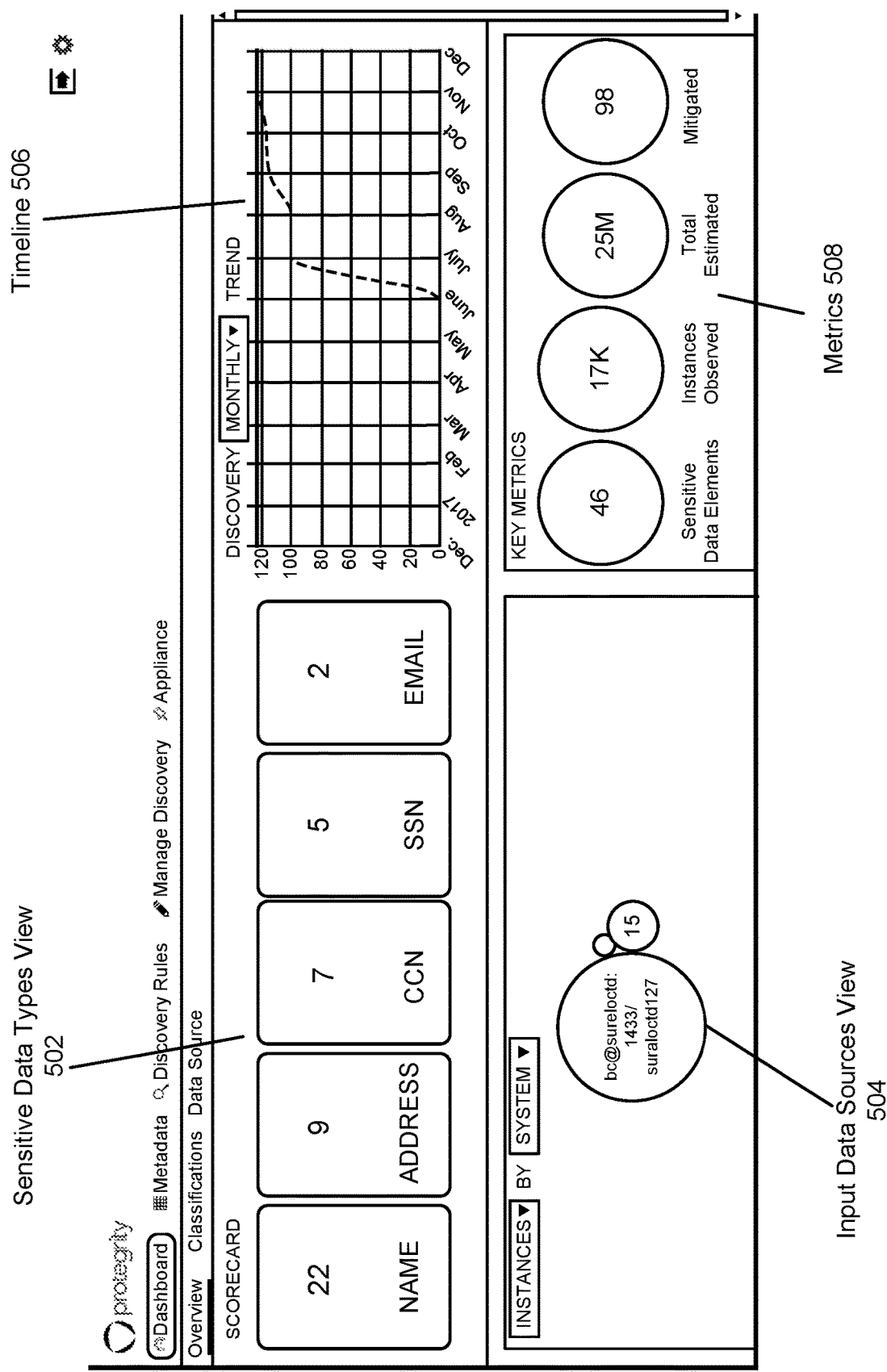
FIG. 5 illustrates an exemplary UI of a primary reporting page indicating where sensitive data is in an organization's data sources, according to an embodiment.

FIG. 5 illustrates an exemplary UI of a primary reporting page indicating where sensitive data is in an organization's data sources, according to an embodiment. In the exemplary UI, the data classification reporting module 114 presents a count of the detected sensitive data in the sensitive data types view 502. The counts presented by the data classification reporting module 114 may represent each detection of a data portions that are sensitive data, or may represent detections of sensitive data types per subsection of the input data source.

The data classification reporting module 114 also presents an input data sources view 504 indicating the number of input data sources that have been processed or sampled. Those input data sources that had more detections of sensitive data may be shown to be larger in size in the UI, and those that had less detections of sensitive data are of smaller size. Each input data source may also be shown with an indication of the number of data portions detected in that input data source.

The data classification reporting module 114 also presents within the UI a timeline 506 indicating a number of detections of sensitive data over time. As shown in the example UI, detections increase at the time point labeled June. This may assist a user in understanding how much sensitive data is being entered into the input data sources of the organization.

The data classification reporting module 114 also presents the metrics 508. These may indicate a count of the number of detections of sensitive data types per subsection of the input data source, a total number of data portions that were detected as sensitive, an estimate of the total number of sensitive data portions in the set of input data sources, and a number of mitigated instances of sensitive data. The estimate of the total number of sensitive data portions may be based on an extrapolation of the portion of the input data sources that have been scanned and the number of detections of sensitive data detected in that portion. This portion may be a random sampling of the data in the input data sources. The mitigated instances of sensitive data may indicate a count of sensitive data types per subsection of the input data source that have had security features applied so that they are not in plaintext or other unsecured format. These security features may be applied, for example, by the data protect module 112.

Figure 6:
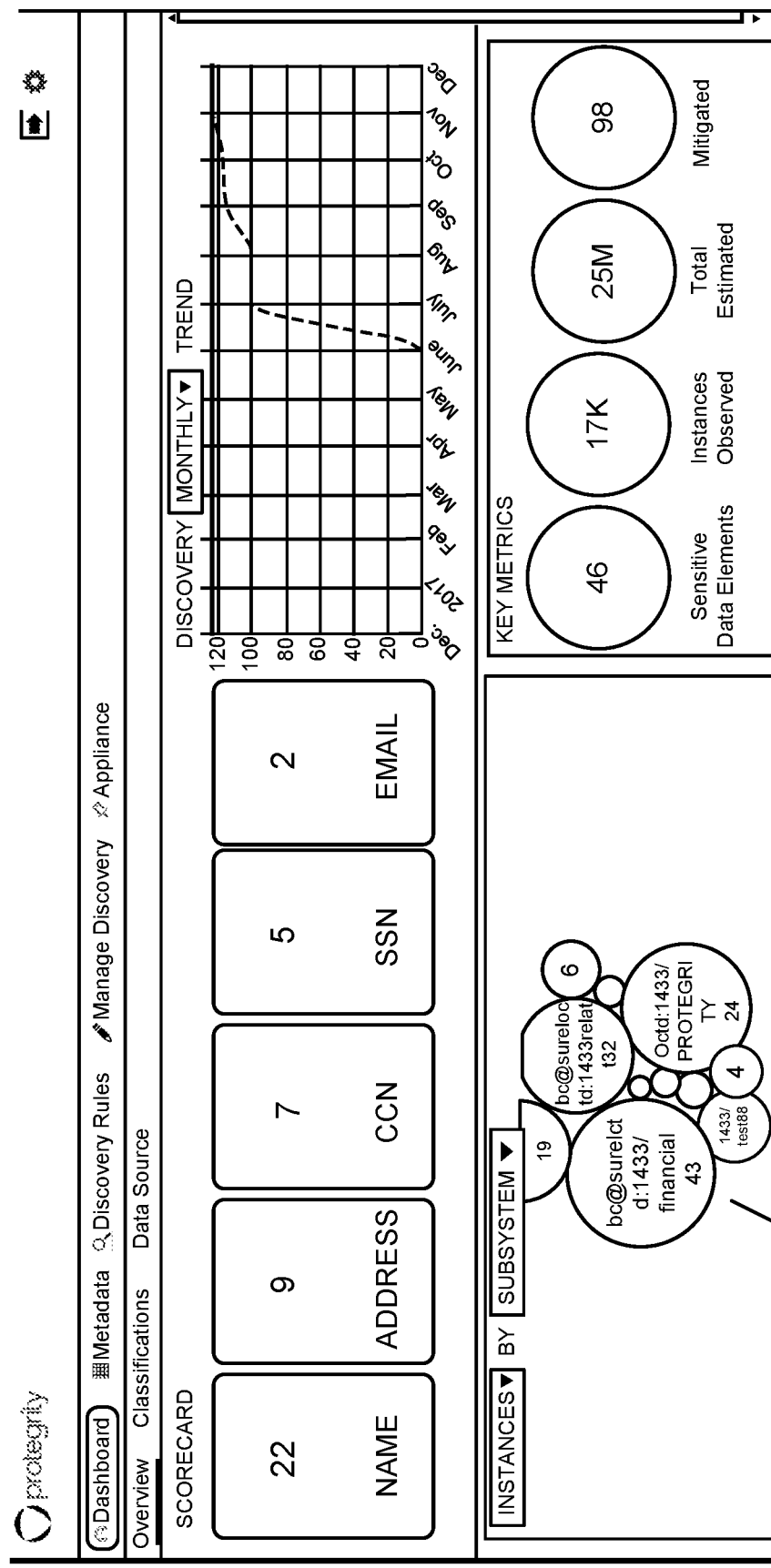
FIG. 6 illustrates an exemplary UI of a primary reporting page indicating where sensitive data is in an organization's data sources listed by subsystem, according to an embodiment.

FIG. 6 illustrates an exemplary UI of a primary reporting page indicating where sensitive data is in an organization's data sources listed by subsystem, according to an embodiment. In contrast to FIG. 5 which had an input data sources view 504 grouped by major systems, e.g., servers, server clusters, databases, FIG. 6 illustrates a subsystem view 602 that presents the input data sources by subsystem, e.g., by individual files, database tables, etc.

Figure 7:
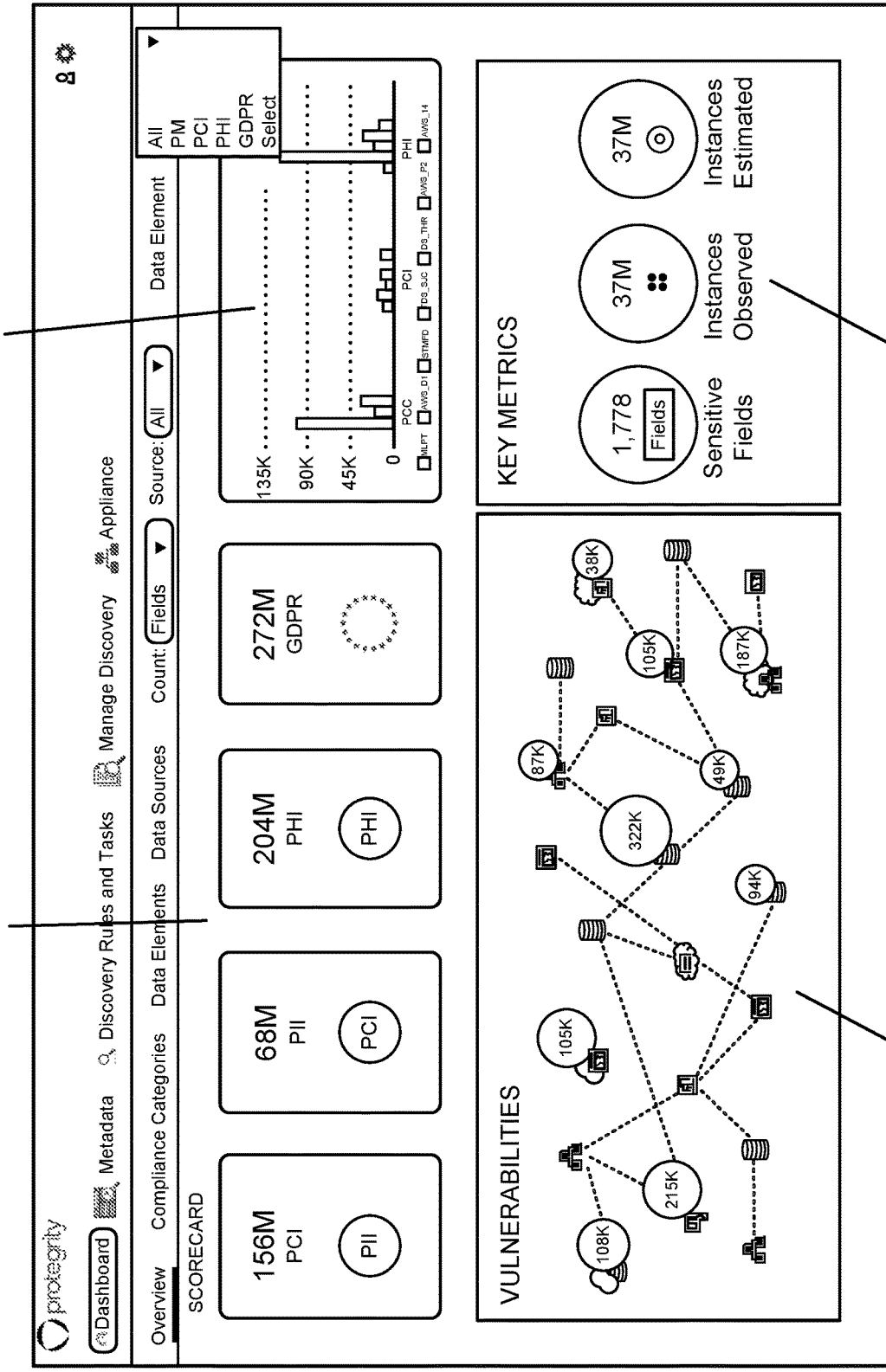
FIG. 7 illustrates an exemplary UI of an alternative reporting page indicating where sensitive data is in an organization's data sources, according to an embodiment.

FIG. 7 illustrates an exemplary UI of an alternative reporting page indicating where sensitive data is in an organization's data sources, according to an embodiment. This exemplary UI may also be presented by the data classification reporting module 114.

Here, the data classification reporting module 114 presents a sensitive data portions view 702, which categorizes the detected sensitive data by broad categories, including personally identifiable information (PII), personal credit information (PCI), personal health information (PHI), private date under European Union law (represented by the 12 stars), and so on. The counts in the sensitive data portions view 702 may indicate the total number of data portions that were detected to be sensitive data.

The data classification reporting module 114 also presents an input data sources plot 704. Instead of representing the input data sources as circles as in FIGS. 5 and 6, here the input data sources are represented in a bar graph, with each bar representing an input data source. Each group of bars represents a particular broad grouping of sensitive data, such as those described above with reference to the sensitive data portions view 702. This may help to visualize which data sources include the majority of which type of sensitive data.

The data classification reporting module 114 also presents a network view 706 illustrating in a network topography where the detected sensitive data is physically stored on the network. This information may be determined based on the network addresses of the input data sources. Each data source that has sensitive data has an adjacent indication in the network view 706 indicating the number of detections in that data source.

The data classification reporting module 114 also presents metrics 708. These are similar to the metrics 508, and indicate various gathered statistics about the sensitive data in the organization, including a number of sensitive data fields, which may indicate a number of database fields in the input data sources that include sensitive data.

FIG. 8 illustrates an exemplary UI of a sensitive data list view, according to an embodiment. This exemplary UI may also be presented by the data classification reporting module 114.

Upon selecting one of the items in the primary reporting page shown in FIGS. 5-7, the data classification reporting module 114 may show a secondary page that drills down into the selected option, such as the one shown here. In the example, the user may have selected the sensitive data type of address in the sensitive data types view 502. This may cause the data classification reporting module 114 to display the sensitive data list view shown here, and to check the box labeled "address" in the search filters 810 in order to filter by sensitive data types of the address type. Note that the user is free to check any of the other boxes in the search filters 810 to further filter the listed data. Additionally, the search filters 810 includes a slider UI labeled confidence score. This slider hides those detected data portions that have a confidence value below a threshold indicated by the slider.

The data classification reporting module 114 displays a coordinate identifier 802, a sensitive data type classification 804, a confidence value 806, and various metrics 808 in each row of the sensitive data list. The coordinate identifier 802 may uniquely identify the subsection of the input data sources at which sensitive data was detected by the data classifier 108 as well as the type of sensitive data that was detected there. The subsection may be indicated by the name of the location at which it is stored as well as the label for the subsection. For example, it may be the name of a database table.

The sensitive data type classification 804 entry indicates the type of sensitive data that was detected. Note that a subsection (e.g., a table) of the input data sources may store multiple sensitive data types. The confidence value 806 indicates the confidence of the system in determining whether the data is sensitive data of the indicated sensitive data type. Finally, the metrics 808 indicate an observed and estimated count of the data portions in the subsection that are sensitive data and of the sensitive data type indicated in the sensitive data type classification 804 column.

Figure 9:
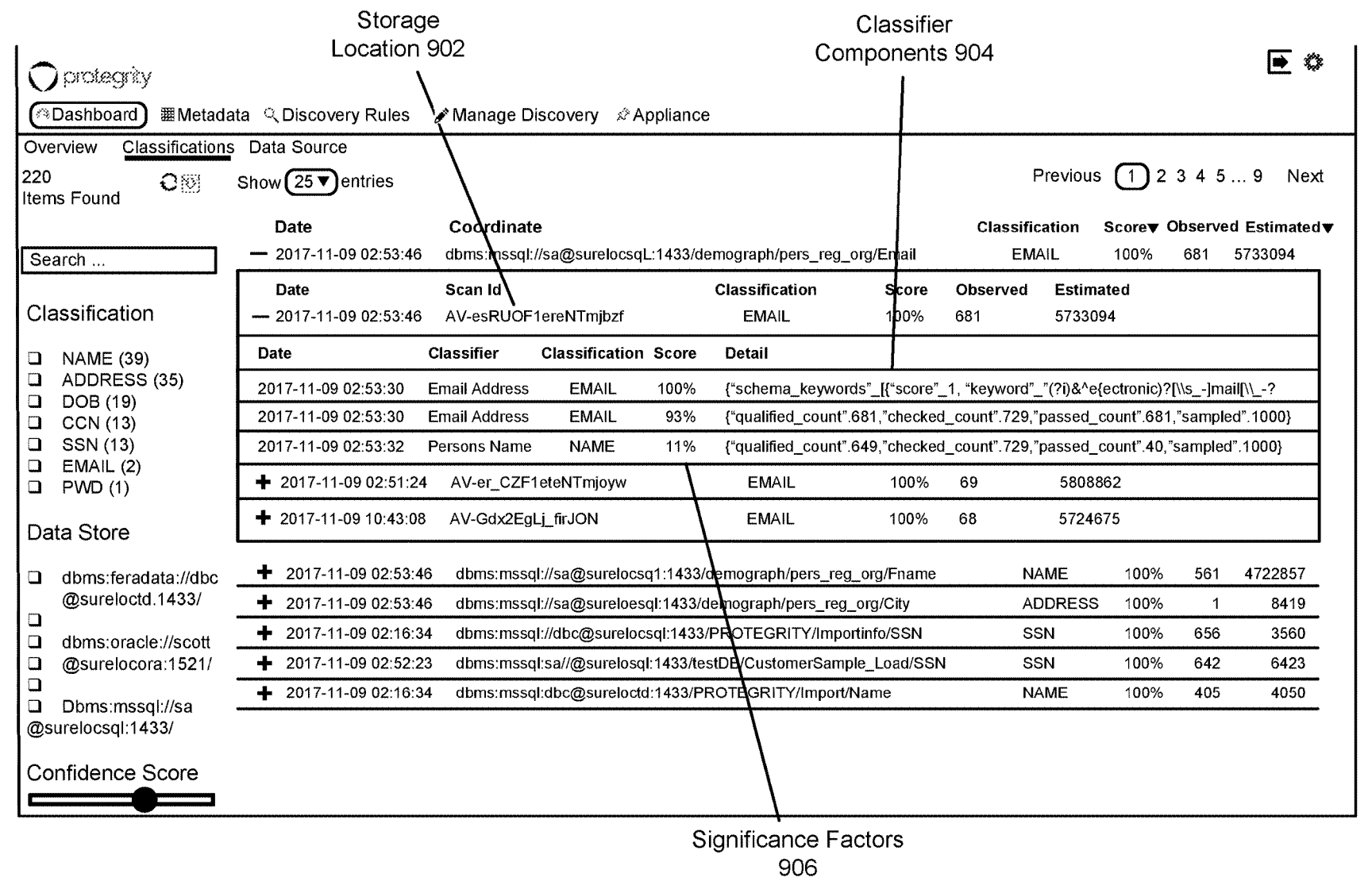

FIG. 9 illustrates an exemplary UI of a drill down view of the sensitive data list view of FIG. 8, according to an embodiment. This exemplary UI may also be presented by the data classification reporting module 114.

A user may interact with any of the row element in the sensitive data list view, which cause the data classification reporting module 114 to display a drill down view of the item that was interacted with. In this case, the first row was interacted with, and an additional drill down view is presented. In the drill down view, the data classification reporting module 114 presents the actual storage location 902 where the sensitive data associated with the interacted row is stored. The data classification reporting module 114 also indicates the classifier components 904 (e.g., metadata analyzer 202, reference data matcher 204), and so on, which were used to scan the sensitive data. Here, the pattern matcher 206 and the reference data matcher 204 were used to determine that the data is sensitive and that it is of an email type. The specific pattern, matching rule, and so on are shown under the "Details" column in the drill down view. The data classification reporting module 114 may present UI options to allow a user to edit the patterns, rules and other configuration options for each component. Further, the user may be able to indicate if the detection was a success or if it was a false positive or false negative. The data classification reporting module 114 also displays the significance factors 906 assigned to each of the components. These may be used to compute the final confidence value described above with reference to FIG. 8.

Figure 10:
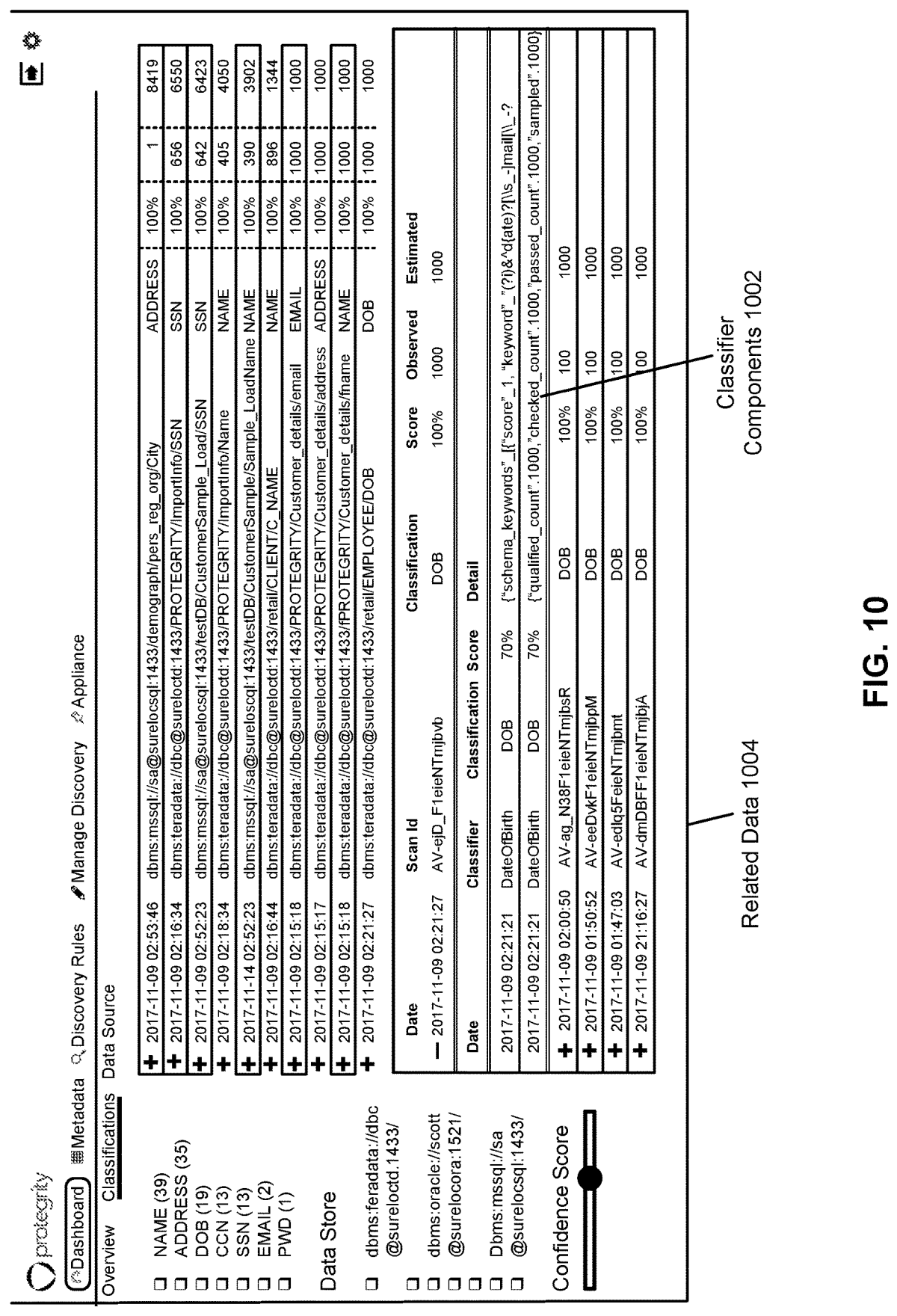

FIG. 10 illustrates an exemplary UI of a different drill down view of the sensitive data list view of FIG. 8 with different classifier components, according to an embodiment. This exemplary UI may also be presented by the data classification reporting module 114. Here, different classifier components 1002 are shown for a different coordinate identifier. Additionally, the data classification reporting module 114 presents the related data 1004, which may be contextual data that is related to the data indicated in the first line of the drill down view.

Figure 11:
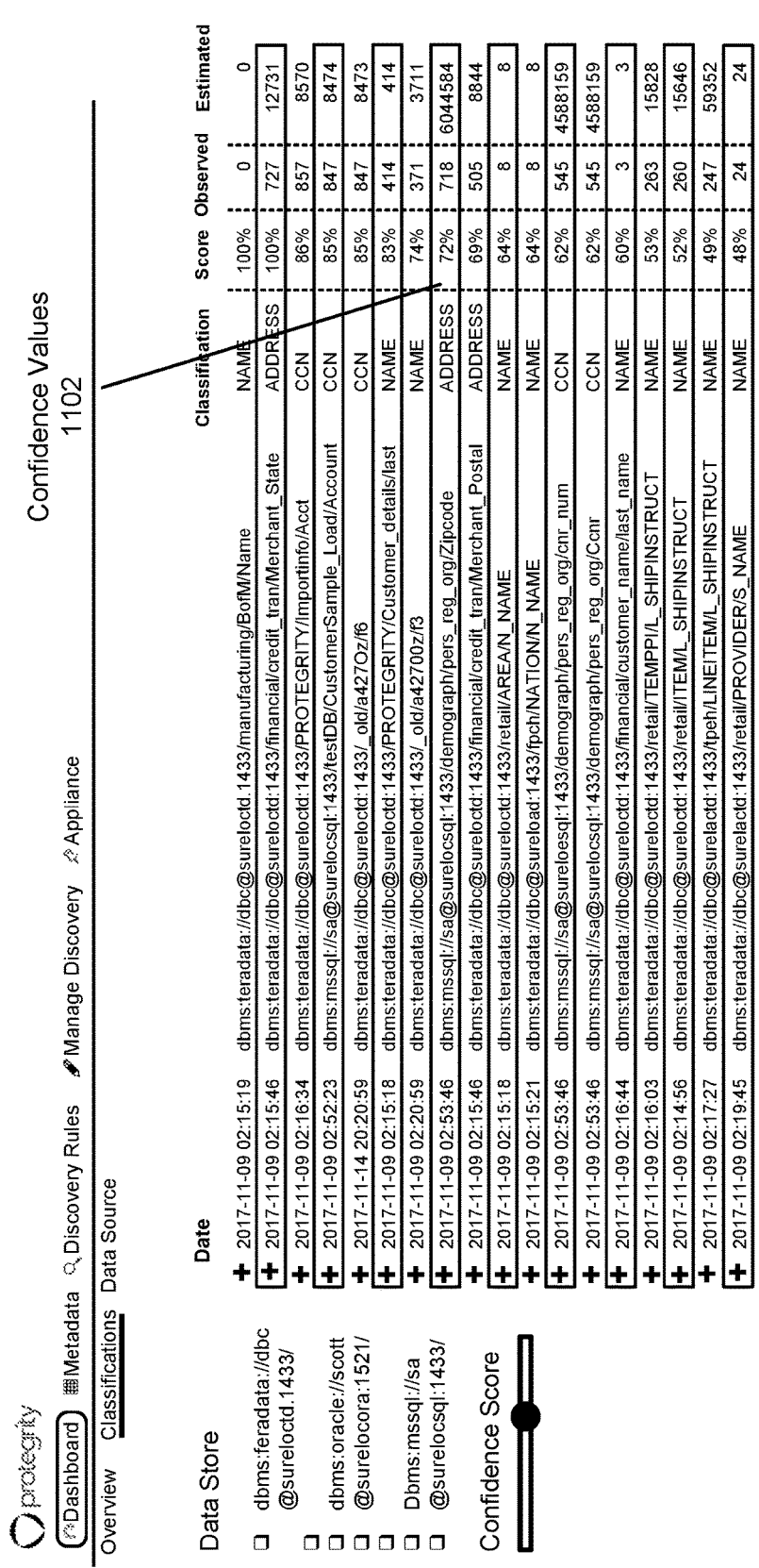
FIG. 11 illustrates an exemplary UI of a further drill down view of the sensitive data list view of FIG. 8 with entries that have low confidence values, according to an embodiment.

FIG. 11 illustrates an exemplary UI of a further drill down view of the sensitive data list view of FIG. 8 with entries that have low confidence values, according to an embodiment. This exemplary UI may also be presented by the data classification reporting module 114. Here the data classification reporting module 114 presents confidence values 1102 which are of a lower score. These may be below the threshold necessary to trigger a detection of sensitive data.

FIG. 12 illustrates an exemplary UI of a different section of the sensitive data list view of FIG. 8 with contextual data, according to an embodiment. This exemplary UI may also be presented by the data classification reporting module 114. Here, the data classification reporting module 114 presents contextual data 1202. The entries shown here may be different columns of a single database table. While the data classifier 108 may determine that the first entry is a credit card number, the significance factor may be low for the detection. However, upon determining that the same table has a column with names, as shown in the second entry, the final confidence value for the detection of the credit card number may be greatly increased because the significance factor of the detection based on the contextual data match is high, thus increasing the combined confidence value.

Example Machine Architecture

Figure 13:
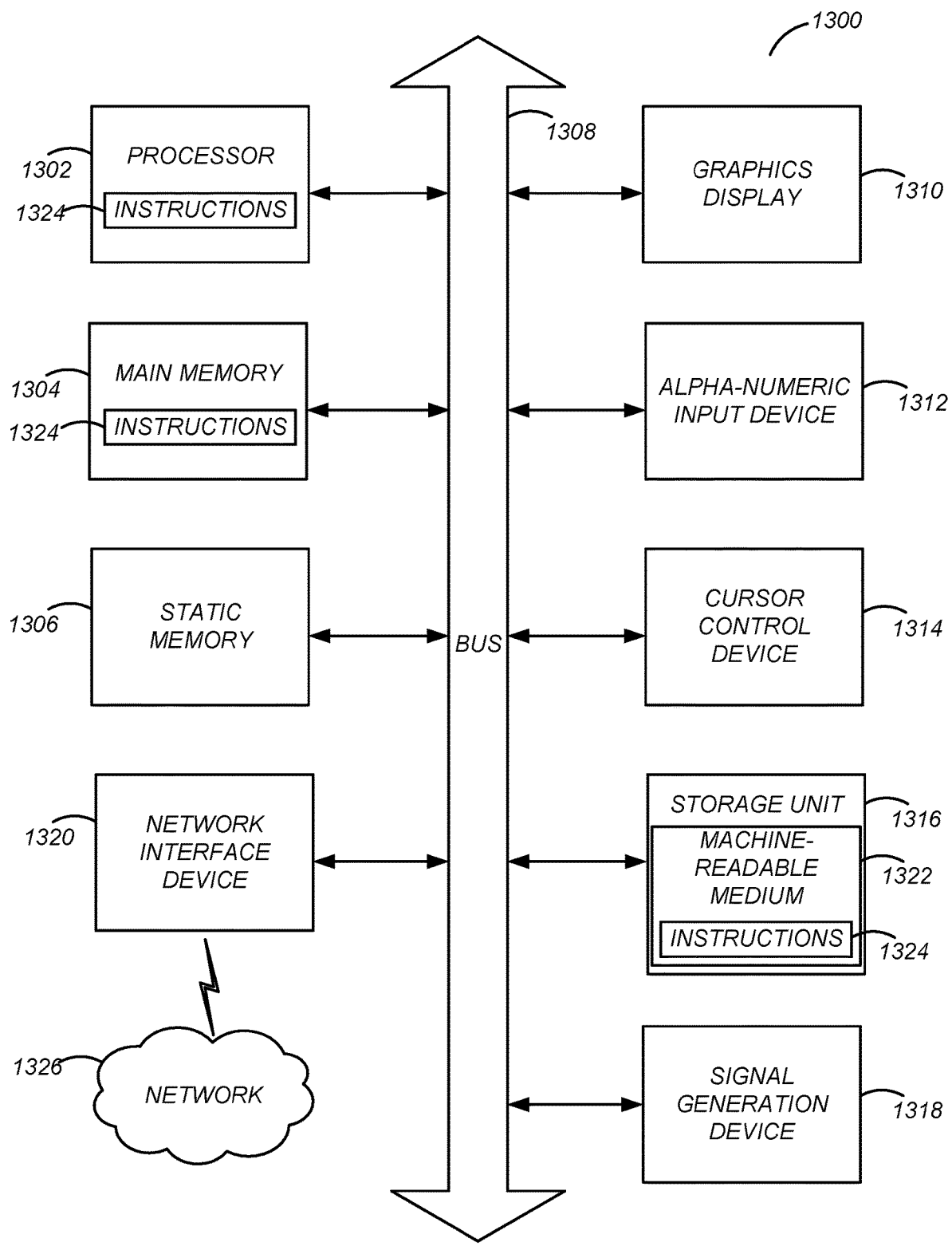
FIG. 13 is a block diagram illustrating components of an example machine able to read instructions from a machine-readable medium and execute them in one or more processors (or controllers), according to an embodiment.

FIG. 13 is a block diagram illustrating components of an example machine able to read instructions from a machine-readable medium and execute them in one or more processors (or controllers), according to an embodiment. Portions, or all, of the example machine described in FIG. 13 can be used with the components described above with reference to FIGS. 1-3. For example, the example machine may be used to execute the data classifier 108.

In FIG. 13 there is a diagrammatic representation of a machine in the example form of a computer system 1300. The computer system 1300 can be used to execute instructions 1324 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The architecture described may be applicable to other computer systems that operate in the systems described above, such as a server computer, a client computer, a personal computer (PC), a tablet PC, a smartphone, an internet of things (IoT) appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes one or more processing units (generally processor 1302). The processor 1302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1300 also includes a main memory 1304. The computer system may include a storage unit 1316. The processor 1302, memory 1304 and the storage unit 1316 communicate via a bus 1308.

In addition, the computer system 1306 can include a static memory 1306, a display driver 1310 (e.g., to drive a plasma display panel (PDP), a liquid crystal display (LCD), or a projector). The computer system 1300 may also include input/output devices, e.g., an alphanumeric input device 1312 (e.g., a keyboard), a dimensional (e.g., 2-D or 3-D) control device 1314 (e.g., a mouse, a trackball, a joystick, a motion sensor, or other pointing instrument), a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store the instructions 1324. The term "machine-readable medium" shall also be taken to include any medium that is capable of storing instructions 1324 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for scanning for sensitive data through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A gateway device, comprising:
   a network interface communicatively coupled with a plurality of data sources;
   a hardware processor; and
   a non-transitory computer readable storage medium storing computer readable instructions, that when executed by the hardware processor, cause the hardware processor to:
   access data from one or more of the plurality of data sources, the accessed data comprising a plurality of data portions;
   access a set of classification rules, each of the set of classification rules configured to classify a data portion of the plurality of data portions as sensitive data, each classification associated with a weight, and wherein one or more of the classification rules are tuned using a classification tuner configured to identify a component that contributed most to false positive classifications of sensitive data, to present the identified component to a user, and to allow the user to manually reduce a significance of the identified component in future classifications;
   determine if the data portion is sensitive by aggregating the weights associated with each classification;
   in response to a selection of a security operation presented to a user via a security user interface responsive to determining that the data portion is sensitive, perform the security operation to produce an encoded data portion associated with a reduced security risk; and
   transmitting the encoded data portion over a communication channel to a data source system.

2. The device of claim 1, wherein a data portion is at least one of: a cell in a table, a non-delimited string of characters, and a file.

3. The device of claim 1, wherein sensitive data is at least one of: an address component, a date of birth, a telephone number, an email address, a social security number, a financial account number, a password, and a username.

4. The device of claim 1, wherein a classification rule of the set of classification rules is satisfied when the data portion matches a pre-defined pattern associated with the classification rule.

5. The device of claim 1, wherein a classification rule of the set of classification rules is satisfied when a data parsing rule associated with the classification rule is applied to the data portion and returns a true value.

6. The device of claim 1, wherein a classification rule of the set of classification rules is satisfied when a contextual data requirement specified by the classification rule is satisfied by one or both of the data portion and associated data sources of the plurality of data sources.

7. The device of claim 1, wherein a classification rule of the set of classification rules is satisfied when the data portion matches an entry in a reference table specified by the classification rule.

8. The device of claim 1, wherein a classification rule of the set of classification rules is satisfied when a trained machine learning model associated with the classification rule returns a score for the data portion beyond a threshold value, the score computed by the machine learning model based on one or more features extracted from the data portion and use as input for the machine learning model.

9. The device of claim 1, wherein the selected security operation includes at least one of encryption, tokenization, and obfuscation, and wherein the selected security operation is performed based on a desired security level for the data portion.

10. The device of claim 1, wherein the expected rate of false positives associated with a classification rule is determined by applying the classification rule to a training data set.

11. A computer-implemented method, comprising:
accessing data from one or more of a plurality of data sources, the accessed data comprising a plurality of data portions;
accessing a set of classification rules, each of the set of classification rules configured to classify a data portion of the plurality of data portions as sensitive data, each classification associated with a weight, and wherein one or more of the classification rules are tuned using a classification tuner configured to identify a component that contributed most to false positive classifications of sensitive data, to present the identified component to a user, and to allow the user to manually reduce a significance of the identified component in future classifications;
determining if the data portion is sensitive by aggregating the weights associated with each classification;
in response to a selection of a security operation presented to a user via a security user interface responsive to determining that the data portion is sensitive, performing the security operation to produce an encoded data portion associated with a reduced security risk associated with the data portion; and
transmitting the encoded data portion over a communication channel to a data source system.

12. The method of claim 11, wherein a data portion is at least one of: a cell in a table, a non-delimited string of characters, and a file.

13. The method of claim 11, wherein sensitive data is at least one of: an address component, a date of birth, a telephone number, an email address, a social security number, a financial account number, a password, and a username.

14. The method of claim 11, wherein a classification rule of the set of classification rules is satisfied when the data portion matches a pre-defined pattern associated with the classification rule.

15. The method of claim 11, wherein a classification rule of the set of classification rules is satisfied when a data parsing rule associated with the classification rule is applied to the data portion and returns a true value.

16. The method of claim 11, wherein a classification rule of the set of classification rules is satisfied when a contextual data requirement specified by the classification rule is satisfied by one or both of the data portion and associated data sources of the plurality of data sources.

17. The method of claim 11, wherein a classification rule of the set of classification rules is satisfied when the data portion matches an entry in a reference table specified by the classification rule.

18. The method of claim 11, wherein a classification rule of the set of classification rules is satisfied when a trained machine learning model associated with the classification rule returns a score for the data portion beyond a threshold value, the score computed by the machine learning model based on one or more features extracted from the data portion and used as input for the machine learning model.

19. The method of claim 11, wherein the selected security operation includes at least one of encryption, tokenization, and obfuscation, and wherein the selected security operation is performed based on a desired security level for the data portion.

20. The method of claim 11, wherein the expected rate of false positives associated with a classification rule is determined by applying the classification rule to a training data set.

* * * * *